(12) United States Patent
Hinderling et al.

(10) Patent No.: US 7,982,859 B2
(45) Date of Patent: Jul. 19, 2011

(54) METHOD AND DEVICE FOR DERIVING GEODETIC DISTANCE DATA

(75) Inventors: Jurg Hinderling, Marbach (CH); Paul Benz, Diepoldsau (CH); Martin De Lange, Kesswil (CH)

(73) Assignee: Leica Geosystems AG, Heerbrugg (CH)

( * ) Notice: Subject to any disclaimer, the term of this patent is extended or adjusted under 35 U.S.C. 154(b) by 38 days.

(21) Appl. No.: 10/545,817

(22) PCT Filed: Jan. 27, 2004

(86) PCT No.: PCT/EP2004/000682
§ 371 (c)(1),
(2), (4) Date: Aug. 16, 2005

(87) PCT Pub. No.: WO2004/074773
PCT Pub. Date: Sep. 2, 2004

(65) Prior Publication Data
US 2006/0119833 A1 Jun. 8, 2006

(30) Foreign Application Priority Data
Feb. 19, 2003 (EP) .................................... 03003738

(51) Int. Cl.
*G01C 3/08* (2006.01)
(52) U.S. Cl. ........................ 356/5.01; 356/5.05; 356/5.11
(58) Field of Classification Search .................... 356/11, 356/5.01–5.15
See application file for complete search history.

(56) References Cited

U.S. PATENT DOCUMENTS

| | | | | |
|---|---|---|---|---|
| 5,506,716 A * | 4/1996 | Mihara et al. | ................. | 398/137 |
| 5,815,251 A | 9/1998 | Ehbets et al. | | |
| 5,949,530 A * | 9/1999 | Wetteborn | .................... | 356/5.01 |
| 5,949,531 A | 9/1999 | Ehbets et al. | | |
| 6,040,796 A * | 3/2000 | Matsugatani et al. | .......... | 342/70 |
| 6,404,702 B1* | 6/2002 | Klinnert et al. | ................ | 367/100 |
| 6,703,967 B1* | 3/2004 | Kuroda et al. | ................. | 342/111 |
| 6,806,824 B2* | 10/2004 | Kornle et al. | ................... | 342/118 |
| 2001/0048519 A1* | 12/2001 | Bamji et al. | .................... | 356/5.1 |
| 2001/0052872 A1* | 12/2001 | Hahlweg | ........................ | 342/128 |
| 2002/0044270 A1* | 4/2002 | Shirai et al. | ................... | 356/4.01 |
| 2002/0154287 A1* | 10/2002 | Bowers | ........................... | 356/5.1 |

(Continued)

FOREIGN PATENT DOCUMENTS

DE 40 02 356 C1 2/1991

(Continued)

OTHER PUBLICATIONS

Kajiwara A., "Stepped-FM Pulse Radar for Vehicular Collision Avoidance", Vehicular Technology Conference, 1998. VTC 98. 48th IEEE vol. 3, May 18-21, 1998 pp. 2085-2089 vol. 3.*

(Continued)

*Primary Examiner* — Thomas H Tarcza
*Assistant Examiner* — Timothy A Brainard
(74) *Attorney, Agent, or Firm* — Oliff & Berridge, PLC

(57) ABSTRACT

According to the invention, a light signal is emitted to one or several targets in order to derive geodetic distance data therefrom. Apparatus components such as transmitters (1") and receivers (4") are modeled along with the targets (3a and 3b) as a linear, time-invariant system which is excited by means of a signal s(t) and the system response y(t) of which is recorded. Unlike in delay meters or phase meters, the distance data is derived from both the delay and the signal form of the system response.

39 Claims, 12 Drawing Sheets

U.S. PATENT DOCUMENTS

| | | | |
|---|---|---|---|
| 2003/0164936 A1* | 9/2003 | Mehr et al. | 356/4.01 |
| 2003/0184728 A1* | 10/2003 | Levine et al. | 356/5.01 |
| 2004/0032362 A1* | 2/2004 | Andersson et al. | 342/109 |

FOREIGN PATENT DOCUMENTS

| | | |
|---|---|---|
| EP | 0 738 899 A1 | 10/1996 |
| EP | 0 932 835 | 8/1999 |
| EP | 1 055 941 A2 | 11/2000 |
| EP | 1 085 346 A1 | 3/2001 |
| GB | 2 336 493 A | 10/1999 |
| JP | A-52-131752 | 11/1977 |
| JP | A-62-135708 | 6/1987 |
| JP | A-05-264723 | 10/1993 |
| JP | A-06-148086 | 5/1994 |
| JP | A-09-152482 | 6/1997 |
| JP | A-09-297014 | 11/1997 |
| JP | A-11-118928 | 4/1999 |
| JP | A-11-352227 | 12/1999 |

OTHER PUBLICATIONS

Joeckel et al.,"Elektronische Entfernungs—und Richtungsmessung"[Electronic Distance and Direction Measurement], 4$^{th}$ Edition, Verlag Konrad Wittwer, Stuttgart 1999.

Wikipedia, Geodetic system (http://en.wikipedia.org/wiki/Geodetic_system) (Jul. 23, 2010).

J.M. Rüeger, *Electronic Distance Measurement*, Feb. 1996, 4$^{th}$ Edition, Sydney, Australia.

Geodesy: Definition from Answer.com, (http://www.answers.com/topic/geodesy?&print=true) (last visited Aug. 20, 2010).

Aug. 4, 2010 Notification of Reasons for Refusal issued in Japanese Patent Application No. 2006501618 with English-language translation.

* cited by examiner

METHOD AND DEVICE FOR DERIVING GEODETIC DISTANCE DATA

The invention relates to a method and a device for deriving geodetic distance data as claimed in the preamble of claims 1 and 23, respectively, and a geodetic measuring instrument as claimed in claim 29, a scanner as claimed in claim 31 and uses of the device as claimed in claims 32 to 34.

The carrying out of distance measurement is a technical task for which a multiplicity of solutions using optical systems has been realized, tacheometers being the classical measuring instruments for surveying tasks for geodesy and the construction industry. In recent years, the tacheometers equipped with a telemeter measuring without reflectors (EDM) have increasingly become established.

Initially, ranges to be surveyed were 60 m but, with the increasing use of the instruments, the requirements with regard to their range constantly increased. Today, the instruments measure up to 200 m without reflectors.

The traditional telemeters are based chiefly on the principle of time-of-flight or the phase difference method. Owing to the high required measuring accuracy in the mm range, however, most instruments today are equipped with an EDM which operates according to the phase measurement principle. In addition, these are advantages in the case of the distance-measuring theodolites, owing to their smaller volume.

However, owing to the low optical power signals on reflectorless objects, phase meters have a small range, so that reflectorless measurements over distances of more than 300 m with a phase meter are scarcely possible. On the other hand, transit time meters have an advantage over the phase meters with regard to the range since measurements over distances of 500 m to reflectorless targets are easily achievable. However, transit time meters have the disadvantage that the absolute accuracy of distance measurement of one mm is scarcely achievable. An overview of various methods and devices for distance measurement is to be found, for example, in "Elektronische Entfernungs- und Richtungsmessung" [Electronic distance and direction measurement] by R. Joeckel and M. Stober, 4th Edition, Verlag Konrad Wittwer, Stuttgart, 1999.

Since the introduction and widespread use of reflectorless telemeters in total stations, the user is often confronted with a further problem which occurs mainly in these reflectorless applications. Particularly in the case of relatively large measured distances or special target or background geometries, there is the effect that the measuring beam emitted by the telemeter strikes two objects simultaneously. One example of this problem is the surveying of an edge, for example a table edge. If this edge is measured, part of the beam strikes the edge to be surveyed and the other part of the beam passes the object and illuminates an object located behind or the floor. A further example is a retroreflector which is present adjacent to a weakly reflecting target object, so that scattered light can pass via the retroreflector into the receiver of the telemeter unit. In a conventional phase meter, this leads to a false distance determination which can be coordinated with neither one nor the other target object. Particularly if reflectorless distance measurements are carried out over large distances, the probability that unintended objects between the actual measured object and the instrument will be measured increases. Another typical case is the distance measurement through trees or mesh fences. In reflectorless applications, the scattered light fraction of such interfering objects can lead to serious false measurements. It is therefore also intended that situations in which a plurality of objects are simultaneously struck by the optical measuring beam lead to correct distance evaluations.

The measuring light back-scattered from natural objects is also extremely weak, particularly in the case of large distances. Associated with this is the difficulty that, in the case of a distance measurement in rain, mist or snowfall, the precipitation particles present in the air will act like an additional target object having a soft surface. Depending on the intensity of precipitation, the interfering influence affects the actual distance measurement. In heavy rain, for example, false measurements are not excluded.

In addition, phase meters give rise to the difficulty that they are not capable of correctly measuring distances to multiple targets. In the received signal, the phase of the various target objects is superposed in an inseparable manner so that no recognizable separation into the components of the individual target objects is possible by the phase difference method. Particularly in mist, rain or snowfall, false measurements are possible.

Telemeters based on the time-of-flight method (transit time method) are among the most powerful telemeters. The range to reflectorless target objects is outstanding, multiple target capability also being realizable in principle. On the other hand, the poor accuracy of distance measurement and complexity of the device are among the major disadvantages of this measuring principle. Transit time meters to date also fail in heavy rain or in dust-laden air. One reason for this is that the low frequency components of the pulse signal are also evaluated, but it is precisely these which are falsified in the transit time by dust or suspended particles.

A further disadvantage of the transit time measurement is due to the laser source. Pulsed lasers having good beam quality, such as, for example, solid-state or microchip lasers, are expensive and complicated with respect to control and current consumption. Semiconductor lasers are economical but, owing to reduced or lacking three-dimensional coherence, have been inadequate to date with regard to beam quality. There are to date no laser diode-based transit time meters which produce a laser beam with a small measuring spot. Distances to contours, such as, for example, edges on objects, therefore cannot be accurately surveyed using telemeters based on semiconductor lasers.

Either the lack of range to reflectorless target objects or the insufficient accuracy of measurement is therefore a substantial disadvantage of all measuring principles known to date.

A further disadvantage is the technically unrealized multiple target capability. In geodetic surveying, there are no known telemeters to date which reliably differentiate between multiple targets and thus reliably permit distance measurements to different targets.

It is therefore the object of the present invention to provide a novel distance measuring method with a device which is suitable for this purpose and in particular both permits reflectorless measurement over large distances and simultaneously has a high accuracy of measurement in the mm range.

It is a further object of the invention also to permit correct surveying of multiple targets.

It is a further object of the invention to reduce the dependency of general atmospheric influences, such as, for example, dust content or smoke, so that precise distance measurements are permitted independently of these influences.

Further objects or requirements to be met are moreover a short measuring time within seconds, rugged and uninfluenced distance measurement under special meteorological conditions, such as, for example, mist, rain or snowfall, and the integratability of a suitable device in geodetic systems, such as, for example, theodolites. This integratability is supported by the possibility of miniaturization or a small construction volume, modular design and reduced energy consumption.

According to the invention, these objects are achieved, or the solutions developed, by the defining features of claims 1 and 23 and by the defining features of the subclaims, respectively.

The solution is based on the concept of an electro-optical telemeter according to the principle of "system analysis". It is neither a pure transit time meter nor a pure phase meter. The distance measuring system comprises the components required for emitting an optical signal, the measured distance with at least one target, optionally a reference distance within the device and the components required for receiving the signal. The system is defined in each case via interfaces which act as system input and output. The telemeter consisting of transmitting and receiving unit together with measured distance and target object is interpreted as a transmission system of an opto-electronic signal. For the sake of simplicity, this transmission system is referred to below as system. Thus, target objects are part of the system. The system is analyzed by the method according to the invention, and in particular the number of transit times to the individual targets (dead times) and the duration thereof are determined. In principle, a system identification is carried out, attention being focused on the determination of the transit time to the target objects at which the measuring beam is directed.

The possible higher sensitivity of the method according to the invention results from various factors. Firstly, with a specific choice of modulation frequencies, excitation signals are emitted and received and the signal shape thereof is scanned and evaluated. The signal shape may have, for example, a sequence of Dirac impulses, but sinusoidal excitation signals, as in the case of phase meters, are also possible. Secondly, in the method according to the invention, the total signal information is evaluated for distance determination, and not just the phases as in the phase difference method or the transit times as in the time-of-flight method. The method according to the invention simultaneously takes account of all serially determined measured data in the evaluation, for example all measurement and model information being aggregated or combined in a cost function. Thus, a phase measurement is not carried out and instead the signal shape in the time domain or frequency domain, but also channel amplification, noise, etc., are measured and are included in the evaluation according to the invention. The signal evaluation is also preferably performed according to a cost function based on the maximum likelihood principle (optimum estimator). In contrast to the phase meters to date, the modulation frequencies of the excitation signal can be changed or selected in a specific manner owing to the flexible and rapidly switchable frequency synthesizer, additionally as a function of the number of target objects and the mutual spacing thereof. The system analysis can be realized with high precision by means of an optimally conditioned set of measured data. Examples are the reduction of interferences due to multiple reflections between target object and telemetry device or the bypassing of interfering signal superposition in the case of multiple targets.

The system identification according to the invention is based on the emission of a number of modulation frequencies which is greater than in the case of a conventional phase meter. Generation of the many modulation frequencies can be realized, for example, with a DDS synthesizer (direct digital synthesizer) or another modern "frequency hopping device", such as the "Fractional-N-Synthesizer". According to the invention, the signal generation can be effected, for example, according to the principle of a direct synthesis, whereby a signal shape stored in an internal memory is fed with periodic repetition sequentially to a digital/analog converter and sent to the output (arbitrary generator).

The evaluation is performed separately for each individual modulation frequency or in aggregation for a plurality of modulation frequencies. The optionally separate evaluation can be realized predominantly with a good received signal, for example as a suboptimum estimator. In the aggregation, all signal data are included in a common model and used for parameter estimation, in particular of the transit times, for example as an optimum estimator.

Preferably, only high modulation frequencies in the MHz to GHz range are emitted so that the system becomes selective with regard to transit times of hard targets and blind with regard to soft targets, such as rain, mist or snowfall. A further advantage of the use of high frequencies is the resultant increased accuracy of distance measurement. In the case of exclusively high frequencies, each frequency contributes to the final result of the parameter determination. This is not the case with conventional phase meters. However, this advantage also exists in relation to the transit time meter, where the statistical averaging is effected over 1000 times fewer pulses, owing to the low pulse repetition rate, which leads to a lower accuracy of measurement.

The choice of the set or sets or of the family of all modulation frequencies influences the quality of the result of the system analysis. For example, a rugged distance measurement can be achieved by an optimum choice of the frequencies in the case of a low received signal, particularly at the signal limit in the case of large target distances. The choice of the set or sets of all frequencies also determines the maximum range to be resolved uniquely (uniqueness). If the family of all frequencies is flexibly handled and adapted to the measuring task to be achieved, as, for example, by a DDS synthesizer, interfering effects due to multiple reflections between target object and telemetry device as well as undesired signal superposition effects in the case of multiple targets are also eliminated.

A strength of the digital signal synthesis lies in the possibility of the flexible frequency concept and hence the optimum adaptation of the family of all frequencies to the distance measuring system to be analyzed, consisting of device and measured distance.

By means of the distance measuring method according to the invention or of the device, it is possible, in contrast to a phase meter, also to measure staggered targets, such as, for example, a measurement through a window pane. The telemeter simultaneously determines the distances to a plurality of targets which are present in the light beam. The optimum frequency concept is in this case a different concept from that in the one-target case.

The distance measuring method according to the invention has multiple target capabilities. It is therefore possible simultaneously to survey the distance of an internal reference light path. The internal reference light path is the first target object, and the distances of all further target objects are surveyed relative to the known reference object. The distance measurement is thus free of temperature drifts and further dispersive influences. Consequently, the multiple target capability is useful for simultaneous calibration over an internal reference light path, so that a previously necessary cost in terms of the device, as results from the selective switching of a reference distance or the use of a second reference receiver, is avoided.

The defined, mathematical system according to the invention comprises the telemetry unit, the target objects involved and the distances to the target objects. This system is understood in the context of telecommunications technology as being a linear transmission system whose system behavior is described by specification of the so-called pulse response h(t).

This is the response of the system if it is excited by a Dirac impulse. The Fourier transformation of the pulse response is referred to as a transmission function H(ω) or complexed frequency response, this being one of the possible descriptions of the system in frequency space or frequency range or frequency domain.

Since the systems are generally excited by causal signals, it is also possible to use the somewhat more general Laplace transformation more stable with regard to convergence, instead of the Fourier transformation.

In the case of the periodic excitation signals, however, the Fourier transformation (FT) can generally be considered as being sufficient. The definition of the generally complex transmission function H(ω) of a system is then as follows:

$$H(\omega) = \frac{Y(\omega)}{S(\omega)} \quad (1)$$

The system-descriptive transmission function is the quotient of the respective Fourier transformed received signal y(t) and Fourier transformed excitation signal s(t).

$$FT:y(t) \rightarrow Y(\omega)$$

$$FT:s(t) \rightarrow S(\omega)$$

The complex frequency response of the system analyzer has the following form:

$$H(\cdot\omega) = \frac{a_n \cdot (i \cdot \omega)^n + a_{n-1} \cdot (i \cdot \omega)^{m-1} + \ldots a_0 \cdot (i \cdot \omega)^0}{b_m \cdot (i \cdot \omega)^m + b_{m-1} \cdot (i \cdot \omega)^{m-1} + \ldots b_0 \cdot (i \cdot \omega)^0} \cdot \left( \sum_{k=1}^{d} \rho_k \cdot \exp(-i \cdot \omega \cdot t_k) \right) \quad (2)$$

where ω is the angle of frequency and i is the imaginary unit and is linked to the frequency f as follows: ω=2·π·f. Furthermore, d is the number of target objects at which the beam is directed, $\rho_k$ is the reflectivity and $t_k$ is the signal transit time proportional to the distance. The distances to be surveyed are calculated according to $$D_k = \frac{c}{2 \cdot t_k},$$

where c is the velocity of light.

The frequencies experience amplification, attenuation and phase shift by the system. The transmission function consists of two terms differing fundamentally in physical behavior: a rational quotient and a sum from exponential functions with the angle of frequency as a linear argument.

The first coefficient (quotient) describes the so-called dispersive influences, produced by the electronic components, such as laser diode, receiver diode and filter. These result in amplitude and phase changes from the input to the output of the system.

The second factor consists of a sum of exponential functions and describes the sought dead times or transit times between the telemetry unit and the individual target objects. The determination of the dead times corresponds to the measurement of the individual distances to the relevant objects.

In order to permit a measurement of the transit times or dead times of the system with high accuracy, the first factor represented as a quotient must either be eliminated computationally or measured and eliminated by means of a system calibration.

This can be ensured, for example, by a system calibration by the manufacturer, which is performed prior to delivery, during manufacture or subsequently in cycles. Particularly in the case of aging effects which are difficult to estimate and, for example, give rise to frequency-dependent transit time delays, constant system calibration "in the field" immediately before or during the actual distance measurement is advantageous.

Such a system calibration should preferably be realized at a time relating to the distance measurement. For this purpose, measuring light is passed over an internal light path of known length. Consequently, the data of the first term in the transmission function are determined at the applied excitation frequencies.

The actual distance measurement is carried out subsequently or simultaneously. The measuring light is sent to the external target objects. The external system surveying is preferably carried out at the same frequencies as in the case of the internal light path, i.e. the transmission function is measured. In the prior art, on the other hand, only complicated solutions with switchable reference distances or dual design of transmitter or receiver are known. For example, EP 0 738 899 discloses a switchable reference distance, EP 0 932 835 describes the use of two receivers and DE 40 02 356 discloses the use of two switchable transmitters.

According to the invention, the measurement can be effected via the internal light path but also simultaneously to the measurement via the external light path, since the method is capable of evaluating multiple targets with high accuracy, the internal reference distance being measured as the first of a plurality of targets. There is no need to duplicate components of the system or to design reference distances to be switchable, as is necessary in some solutions of the prior art.

A method according to the invention for the technical and computational realization of the system calibration is the determination of the transmission function H(ω) in the case of a selected quantity of frequencies (irregular or regular frequency sampling), in particular over the internal light path and secondly over the external measuring light path.

For the system calibration, equation (1) can be written completely in a polar or exponential representation:

$$H(\omega) = |H(\omega)| \cdot \exp(-i \cdot \omega \cdot t_{disp}(\omega)) \cdot \left( \sum_{k=1}^{d} \rho_k \cdot \exp(-i \cdot \omega \cdot t_k) \right)$$

By means of the system calibration, the system amplification |H(ω)| and the dispersion $t_{disp}(\omega)$ are determined at the frequencies emitted in the measuring signal. These can therefore be assumed to be known in the actual distance measurement to the target objects.

The correction therefore takes into account, inter alia, the amplification/attenuation and the dispersive lag times at the measured frequencies. These undesired effects are contained in the first two terms of the transmission function.

The calculation of the transmission function is performed, for example, by means of discrete Fourier transformation (DFT). The received signal is scanned by means of an analog/digital converter (ADC) in the time range, and the frequencies contained in the measured signal and the complex amplitude Y(ω) are then calculated by means of DFT. With Y(ω), the system amplification |H(ω)| and the dispersion $t_{disp}(\omega)$ are also known.

By comparing the frequency-dependent amplitude, phase and noise results of an internal and external measuring path, it is therefore possible to make a correction to the transmission function in a manner such that, of H(ω) or H(f), only the term with the dead times k remains as an unknown in the exponential sum.

There therefore follows as a transmission function of calibrated data:
for the one-target case:

$$Hc(f) := \rho_1 \cdot \exp(-i \cdot 2 \cdot \pi \cdot f \cdot t_1)$$

for the multitarget case with d targets:

$$Hc(f) := \sum_{k=1}^{d} \rho_k \cdot \exp(-i \cdot 2 \cdot \pi \cdot f \cdot t_k) \quad (3)$$

the calibrated transit times to the measured target objects once again being denoted by $t_k$ for the sake of simplicity.

The system calibration can be carried out directly in the time domain. Instead of the transmission function H(f), the transit times of the system responses to the various excitation signals are determined over the internal light path.

A system calibration in the sense of the maximum likelihood estimator theory also makes it possible to combine all measured system responses into a single cost function in order to evaluate therefrom calibrated distance measurement data for the target objects.

With the knowledge of the total, continuous spectrum, the corresponding pulse response of the system can be calculated by inverse Fourier transformation (IFT):

$$h(t) := \int H(f) \cdot \exp(+i \cdot 2 \cdot \pi \cdot f \cdot t) df \quad (4)$$

If H(f) corresponds to equation 3 and is known at all frequencies, it is then possible to close the integral. The pulse responses are:
for the one-target case:

$$h(t) := \rho_1 \cdot \delta(t - t_1)$$

for the multitarget case with d targets:

$$h(t) := \sum_{k=1}^{d} \rho_k \cdot \delta(t - t_k)$$

It is evident that the pulse response directly contains all distance data $t_k$ for the d target object in the measuring beam.

Equations 3 and 4 are also valid if, instead of measurement directly at the modulation frequencies, heterodyne or homodyne measurement is effected. The high-frequency received signal is mixed in with a high frequency mixer signal to give a low frequency electronic signal. By evaluating the low frequency signal, amplitude and phase of the actual high-frequency received signal can be determined.

In the forms realization of a telemetry device according to the invention, the total complex spectrum H(f) of the system is not measured; the measured or transmitted signals excite the system only at a portion of all system frequencies, and usually it is only a family of discrete frequencies which are measured. The spectrum H(f) is therefore not known for every frequency but only pointwise.

Furthermore, the reconstruction of the pulse response h(t) as a time signal by means of IFT is therefore not directly possible.

The problem consists in principle in the calculation of the parameters of the transit times $t_k$ in equations 3 or equation 4.

Various evaluation methods are suitable for calculating the transit times or distances. The choice of the optimum method in each case is dependent on system-specific features of state. For example, these characteristic features of a system include: number of targets, distances to the targets, reflectivity of the targets, signal amplitudes, magnitude of the noise level, etc.

For deriving a piece of distance data, it is possible to use either the total signal shape y(t) or only a part of the signal shape, it being possible to understand such a part as meaning, for example, the following quantities: maximum value of the signal shape y(t), amplitude of the first harmonic or area under the curves y(t) within the full width at half maximum of a signal pulse. In the case of a statistical evaluation, the RMS noise of the signal shape y(t) is also understood as meaning a part of a signal shape.

The main part of the distance data is in the structure of the signal shape as a function of time. Examples of this are the shift of the system responses y(t) relative to the excitation signal s(t) as a function of time, but in particular the mutual, relative distances of reflective pulses as a function of time in systems with multiple targets. In the context of a moment analysis, the position of the center of gravity of one or more signal pulses as a function of time can also be understood as an example of a structure of the signal shape as a function of time.

Below, some possibilities of evaluation in the time or frequency domain are described only by way of example and not definitively.

A first method of distance determination is the evaluation in the time range. If, for example, the transit times of periodic pulses of a short duration are measured in succession at different pulse rates, the distance can be calculated uniquely with high precision.

In the distance determination in the time range, the optimum choice of the pulse repetition frequencies is relevant. These should be chosen so that the reflected signals from multiple targets strike the receiver at different times. As a result, troublesome overlaps of signal pulses are avoided and an individual signal pulse can be coordinated with each target object.

This optimized frequency choice is possible according to the invention with the aid of the frequency synthesizer. An example of an evaluation method is shown in FIG. 5a. Each excitation signal s(t) produces a response signal y(t). Signal responses h(t) calibrated over the internal light path are derived therefrom by means of signals. These calibrated signal responses h(t) of all excitation signals s(t) are time-shifted relative to one another, it being possible to determine the relative shift times $\Delta t_{jk}$, for example, by cross-correlation calculation or calculation of the center of gravity. These shift times $\Delta t_{jk}$ give information on the number of pulses which are in transit along the transmission distance (uniqueness).

In a further step, it is possible to construct a time signal z(t) which is formed from the sum of the time-shifted signal responses $h_k(t - \Delta t_{jk})$ of all excitation signals $S_k(t)$. From z(t), the transit times $t_n$ are then finally determined, for example once again via a cross-correlation calculation or calculation of the center of gravity.

A further method is the nonlinear balancing calculation between the spectral model of the transmission function H(f)

according to equation 3 and the measuring points $H(f_k)$ at the analyzed modulation frequencies.

Another method of distance estimation is based on the principle of a maximum likelihood estimator. The measured spectral data are input into a cost function, and the global maximum or minimum of this function then gives the estimated value for the d distances.

In the specific case, the maximum likelihood estimator is a simple one-dimensional cost function having a pronounced global maximum. With a suitable choice of the discrete measured values of the complex spectrum, other methods which likewise permit the precise and rugged distance calculation can also be realized in the specific case. For example, the inverse Fourier transformation of the discrete frequency samples can be interpreted as an approximation of the maximum likelihood function.

For the one-target case, the following then applies:

$$z(t) := \frac{1}{N} \cdot \sum_{k=0}^{N-1} H(f_k) \cdot \exp(i \cdot 2 \cdot \pi \cdot f_k \cdot t) \quad (5)$$

The generally complex function $z(t)$ is thus calculated directly from all N measured complex amplitudes $H(f_k)$ of the discrete frequency spectrum and corresponds to a time signal, said function containing all data collected in the system analysis. The global maximum of the time function $Re(z(t))$ is taken at the transit time $t_1$.

The inverse Fourier transformation (IFT) method can also be successfully used for the multitarget case. However, additional conditions are linked to the choice of the complex amplitudes determined in the system analysis at discrete frequencies. Not every quantity of irregularly scanned points of the transmission function leads to a one-parameter time function which has the maxima at the transit times of the d target objects.

For the multitarget case, the IFT is extended by a window function $W(f)$ known from the theory of Fourier transformation, such as, for example, the Hanning window or the Blackman window, and the following then applies:

$$z(t) := \frac{1}{N} \cdot \sum_{k=0}^{N-1} H(f_k) \cdot W(f_k) \cdot \exp(i \cdot 2 \cdot \pi \cdot f_k \cdot t) \quad (6)$$

The weight function $W(f)$ considerably increases the accuracy of distance measurement in the multitarget case.

An example of a frequency concept suitable for the multitarget case will be given below.

A frequency concept optimized for the multitarget case and in the form of a set of frequencies is formed by equidistant excitation frequencies. Such a concept may comprise, for example, the following frequencies: 400 MHz, 410 MHz, 420 MHz, ... 500 MHz.

It is often sufficient to calculate the magnitude of the time signals $z(t)$ generated by the IFT, the typical shape of such a time signal produced from equidistant excitation frequencies being given by way of example in FIG. 13. The transit time sought is contained in the calculated pulse-like time signal $|z(t)|$. If a plurality of pulses occur, a multitarget case is present. Owing to the discretely measured frequencies, the calculated time signal is time-periodic. The periodicity of the calculated time signal therefore limits the maximum range. By a suitable choice of the set of equidistant frequencies, the maximum range can be easily extended to over 500 m without sacrificing accuracy of measurement.

In order to minimize the number of excitation frequencies required for the system analysis, the frequency concept is divided into a plurality of frequencies at equidistant steps. In other words, this means that, in a first analysis step, equidistant frequencies with a fine frequency interval are emitted. The time signal $z(t)$ or $|z(t)|$ is then calculated by means of IFT, and the approximate distance is determined. An example is shown in FIG. 14: 100 MHz, 100.5 MHz, 101 MHz, 101.5 MHz, ... 105 MHz.

In a second analysis step, another set of equidistant frequencies with a coarser frequency interval is emitted, and the corresponding time signal $z(t)$ is then once again calculated by means of IFT. The result is a precise determination of the distances. This is shown by way of example in FIG. 14: 100 MHz, 107.5 MHz, 115 MHz, ... 175 MHz. If the accuracy of distance measurement is still insufficient, the system analysis can be refined using an equidistant frequency set with even coarser steps.

Instead of the time signals $z(t)$ as a cost function, it is also possible to use for the distance calculation a power signal $\overline{z(t)} \cdot z(t)$ generated by a weighted IFT, as shown by way of example in FIG. 15. $\overline{z(t)}$ denotes the conjugated complex time signal $z(t)$.

The system is excited with periodic transmitted signals as an input quantity. In the simplest case, this can be realized by a harmonic sinusoidal oscillation. Preferably, however, pulses of short duration with, for example, rectangular, triangular, Dirac impulse or other signal shapes are periodically generated. The frequency spectrum of the transmitted signal is therefore discrete and, in addition to the fundamental harmonics, the corresponding higher harmonic frequencies are simultaneously generated in the spectrum, depending on the pulse shape.

For a system analysis, a plurality of periodic transmitted signals of different repetition frequencies are used. These are applied in succession to the system input, and the corresponding output signals are measured. Once all periodic signals have been measured, the system measurement (system analysis) is complete. In the spectral range, the higher harmonic spectral components of the periodic signal responses are measured in addition to the fundamental harmonics of said responses.

In the inventive embodiment, generation of the set of excitation frequencies can be realized, for example, by means of a DDS synthesizer (direct digital synthesizer). These compact single-chip modules can generate virtually any arbitrary frequency with very high precision. The switching time for frequency change is less than one msec and is negligibly short in comparison with the required measuring time for the system analysis. The switching is controlled, for example, by a microprocessor via a data bus. The clock frequency for synchronization of the DDS module can be generated by a ppm-accurate master oscillator. This frequency serves in this case as the basis for the scale calibration of all excitation frequencies, which guarantee distance resolution in the ppm range.

In addition to the DDS frequency synthesizer, other modern "frequency hopping devices", such as the fractional-N-synthesizer, are also known. Owing to the rapid and finely graduated frequency switching, such modules are also suitable as generators of the required modulation frequencies.

An advantageous element is the determination of the signal strength (amplitude) of the emitted excitation frequencies, since the knowledge of both amplitudes of the transmitted signal and of the received signal, is used for calculating the complex transmission function $H(f)$.

The type and choice of the respective optimum periodic excitation is dependent, as in the method for distance calculation, on the system-specific features of state, such as, for example, number of targets, target distances, signal-to-noise ratios, etc. Taking into account these actual system-specific features of state, the excitation spectrum for system analysis can be optimally selected or configured very flexibly on site using the DDS synthesizer and optionally further components.

For the 1-target case, for example, the repetition frequencies of the periodic transmitted signal with a logarithmic equidistant graduation are chosen. The cost function s(t) calculated by means of inverse Fourier transformation then produces an estimator-true global maximum rugged with respect to noise, as also shown in FIG. 12.

In the case of target plates which produce multiple reflections between target point and telemetry device, the repetition frequencies of the transmitted pulses are preferably used with a graduation according to the prime numbers. The cost function s(t) calculated by means of inverse Fourier transformation then produces an estimator-true global maximum of the sought distance to the target plate.

In measuring situations with a plurality of targets in the measuring beam, for example, periodic transmitted signals with equidistant frequency graduations are used for the system analysis.

In order to achieve high accuracies of distance measurement (sub-mm) even over large distance ranges of, for example, 500 m, a plurality of sets of excitation frequencies with equidistant graduations can be used, as already described. As a rule, 2 sets of excitation signals having different intervals between the repetition frequency are sufficient, as shown in FIG. 11.

In summary, basically 3 evaluation methods achieve the aim for a system analysis.

1. One method is the evaluation of the system data in the time range. By measuring the relevant transit times of the signal responses of all pulse sequences which are time-shifted relative to one another, the number of pulses which are simultaneously in transit along the transmission distance (uniqueness) can be determined. The distance to the target objects sought is finally obtained from the measurement of the transit time between the currently sent and the simultaneously received signal pulse combined with the number of pulses between transmitting and receiving unit.

2. A further method is the evaluation in the frequency range. By the application of DFT/FFT to the measured periodic time signals, the parameters of the transmission function H(f) are calculated at the excitation frequencies (including higher harmonics). If the transmission function H(f) is measured for sufficient frequencies, the distance determination can be calculated, for example, by the least squares method, by means of a cost function according to the maximum likelihood principle or a cost function defined according to other criteria.

3. A further method is the extension of the evaluation in the frequency range. If the transmission function H(f) is measured at a sufficient number of frequencies, a time signal z(t) corresponding to the pulse response is reconstructed by application of IFT, so that an evaluation is once again effected in the time range. The system dead times or transit times to the individual target objects are determined by the signal maxima or signal minima of Re(z(t)).

On the device side, the optical received signal reflected by the target objects is detected by a preferably electronic broadband opto-electronic receiver. The excitation signals are high-frequency signals in the MHz or GHz range. In order to avoid high-frequency signal scanning with an AD converter (ADC), in a possible embodiment, for example, the received signal may also be fed to an electronic mixer (heterodyne receiver). At the output of the mixer, the time signal transformed to low frequency is scanned by means of an ADC and the measuring points are fed to an evaluation unit or a memory.

The scanned time signals of different repetition rates are preferably transformed by means of a DFT transformation into the frequency range, the results being the complex amplitudes of the transmission function H(f) at the respective frequencies. Further measuring points of the complex transmission function H(f) are determined with each periodic transmitted or excitation signal. Once sufficient measuring points of the complex transmission function H(f) are known, it is possible to begin the distance calculation according to one of the methods for determining the dead times.

An embodiment according to the invention of a system analyzer for the one-target case with increased range and insensitivity to rain, snowfall or mist is realized, for example, as follows. The excitation frequencies for the system analysis are generated by a DDS synthesizer, a determination of the amplitudes of the excitation frequencies being carried out. The amplitudes of the excitation frequencies can also be calibrated once at the factory.

The signal reception is designed to be heterodyne by means of an electronic mixer and a PLL signal, the signal detection being effected by pulse-synchronous digitization with an ADC. As an alternative, direct signal scanning in the high frequency range can also be realized instead of the heterodyne reception method.

The first step of the evaluation of the digitized received signal is carried out by means of the DFT transformation in the processor unit. The calculation of a time signal equivalent to the pulse response is then performed with the aid of the IFT method.

A time signal equivalent to the pulse response is then calculated with the aid of the IFT method. Rain, mist or snowfall reflect a part of the optical transmitted signal. Since, however, signal components are formed by integration over the total measuring distance as a result of scattering, a frequency-independent dead time is not superposed on the pulse response, but a frequency-dependent transit time (dispersion). Theoretical considerations and experiments show that the interfering dispersive influence on the transit time behavior of the system disappears as soon as the excitation frequencies are above 10 MHz. The influence of rain or mist on the signal amplitude shows low-pass behavior with a cut-off frequency at about 1 to 5 MHz. If exclusively modulation frequencies higher than about 10 MHz are therefore used for the system analysis, the influence of precipitation particles in the air on the distance calculation to the actual target objects is negligible.

The large number of modulation frequencies due to the DSS technology results in data redundancy as a further advantage. If, for example, the optical measuring beam is accidentally interrupted by a person during the system analysis, the fault produces a discontinuity in the transmission function H(f), which, owing to the large number of modulation frequencies, can be easily detected and can be neglected in the further signal evaluation. The remaining spectral points of H(f) are then sufficient for the distance calculation, without noticeable sacrifices in accuracy.

Another embodiment according to the invention of a system analyzer for the multitarget case is realized, for example, according to the following scheme.

The generation of the, preferably flexible, number of excitation frequencies for the system analysis is effected by a first DDS synthesizer combined with a down-circuit frequency converter for generating very high frequencies. The latter guarantee high accuracy of distance measurement. The arrangement without PLL permits rapid frequency switching in the μsec range. At the same time, the amplitudes of the excitation frequencies are determined on the transmitter side, it also being possible to calibrate the amplitudes once at the factory. In the receiver circuit, a second DDS synthesizer switchable just as rapidly generates the mixer signals for the heterodyne or homodyne reception. Stepwise tuning of the frequency is thus effected over a greater frequency range than would be accessible with a single DDS. Digitization by means of an ADC is used for signal measurement. The signal evaluation by means of the DFT/IFT method is effected in the processor unit with calculation of a time signal equivalent to the pulse response.

The method according to the invention and suitable devices for carrying out the method are described in more detail below, purely by way of example, with reference to embodiments shown schematically in the drawing. Specifically, FIG. 1a-b show a diagram illustrating the principle of a pulse measurement method according to the prior art;

FIG. 2a-b show a diagram of the principle of a phase measurement method according to the prior art;

Figure 5A:
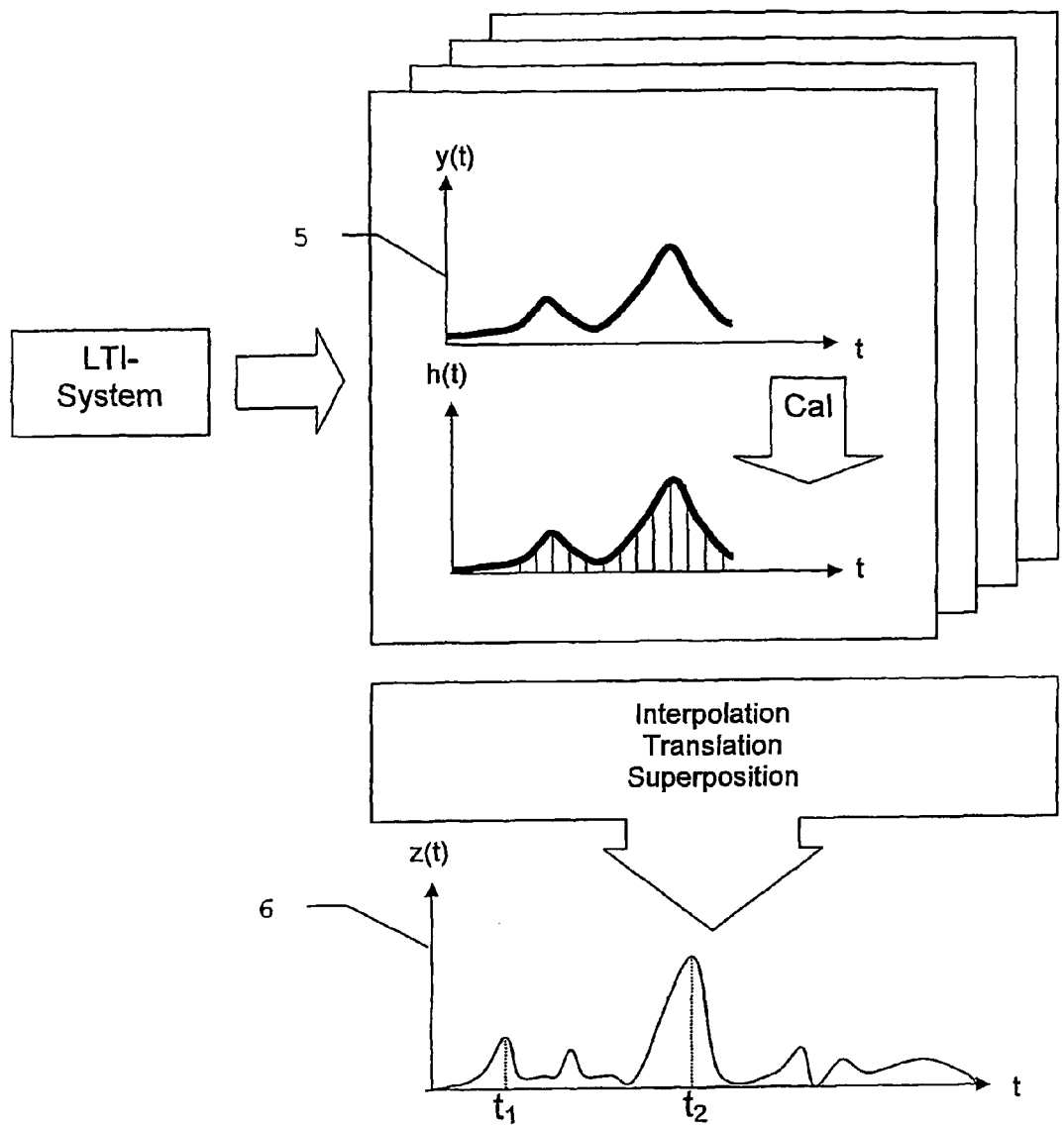
Figure 5B:
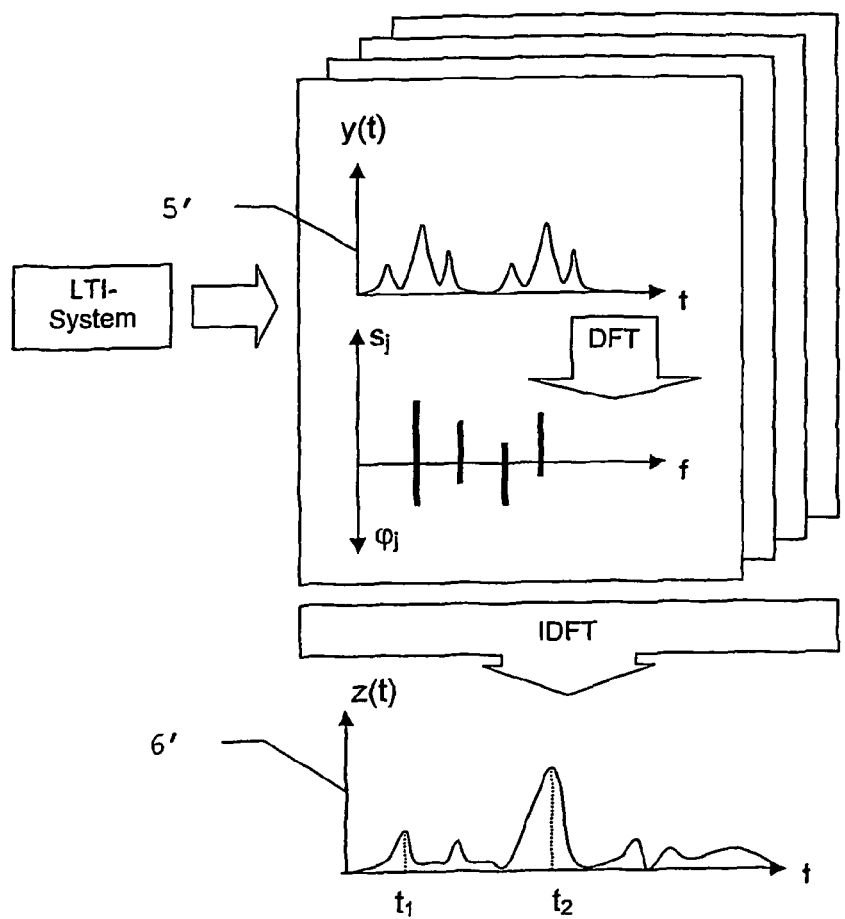
Figures 6A, 6B:
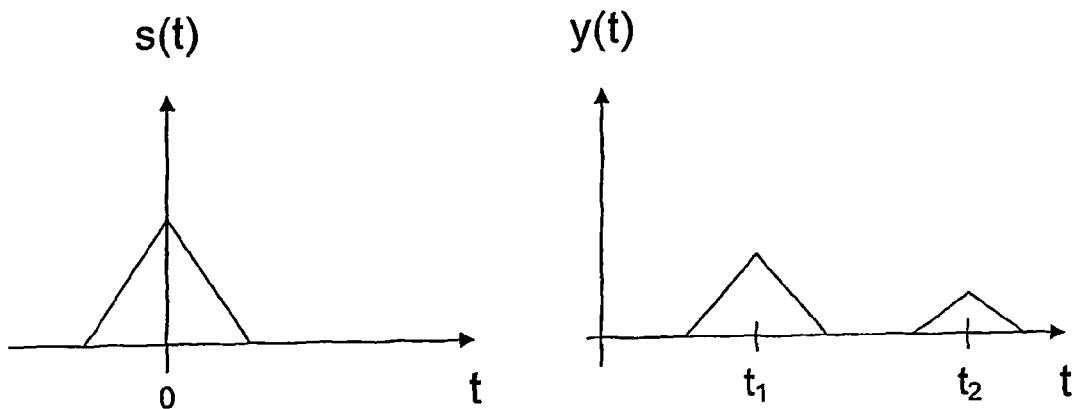
Figure 7:
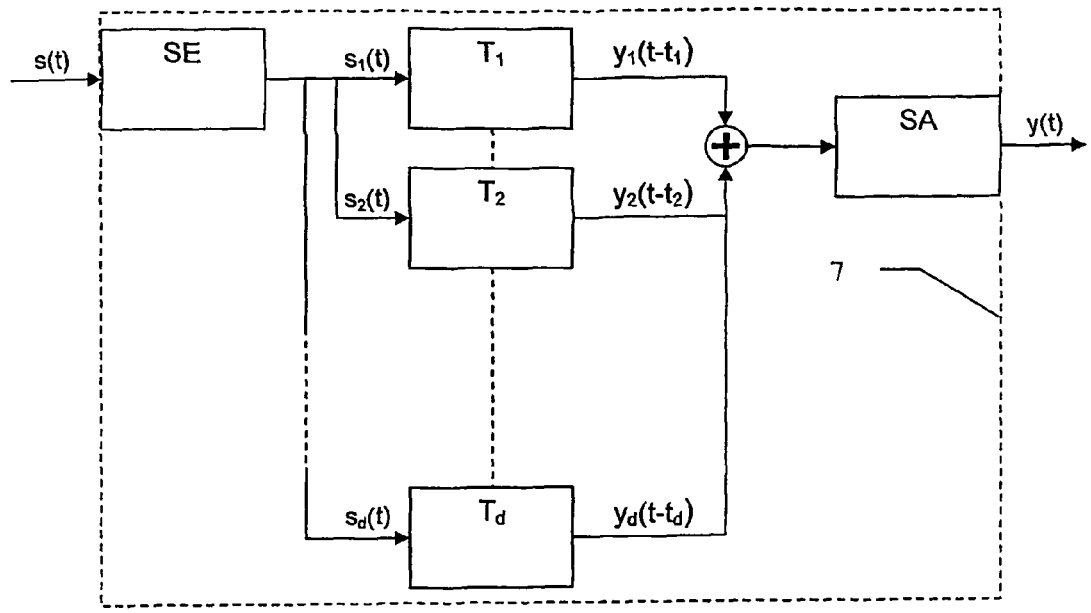
Figure 8:
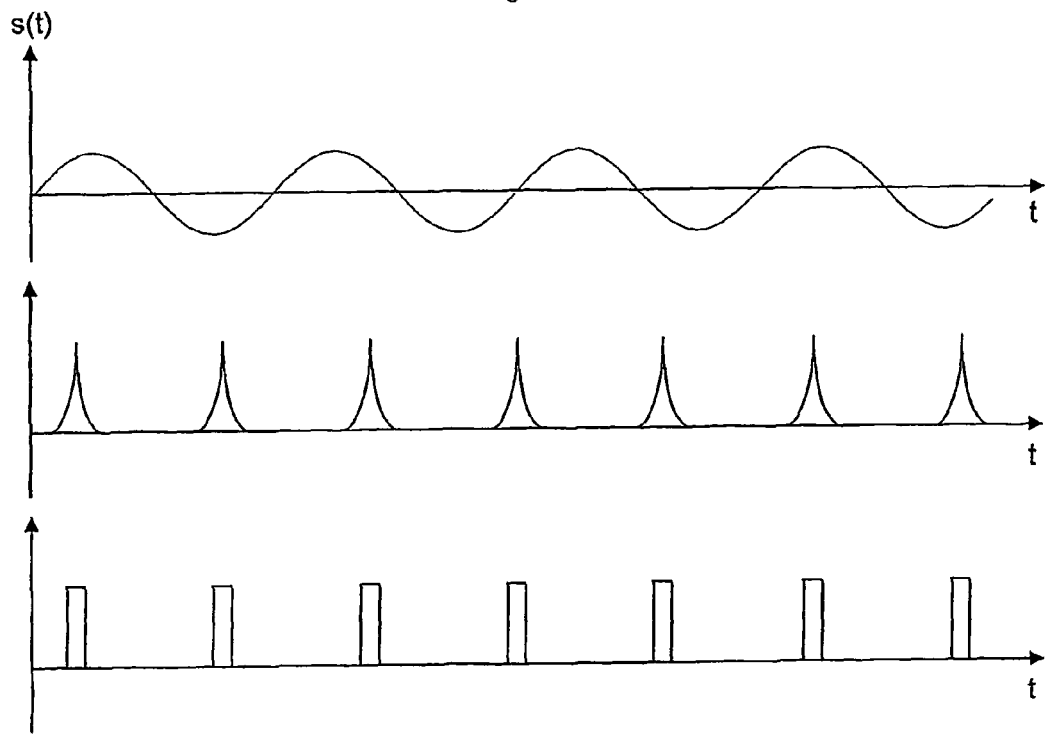
Figure 9:
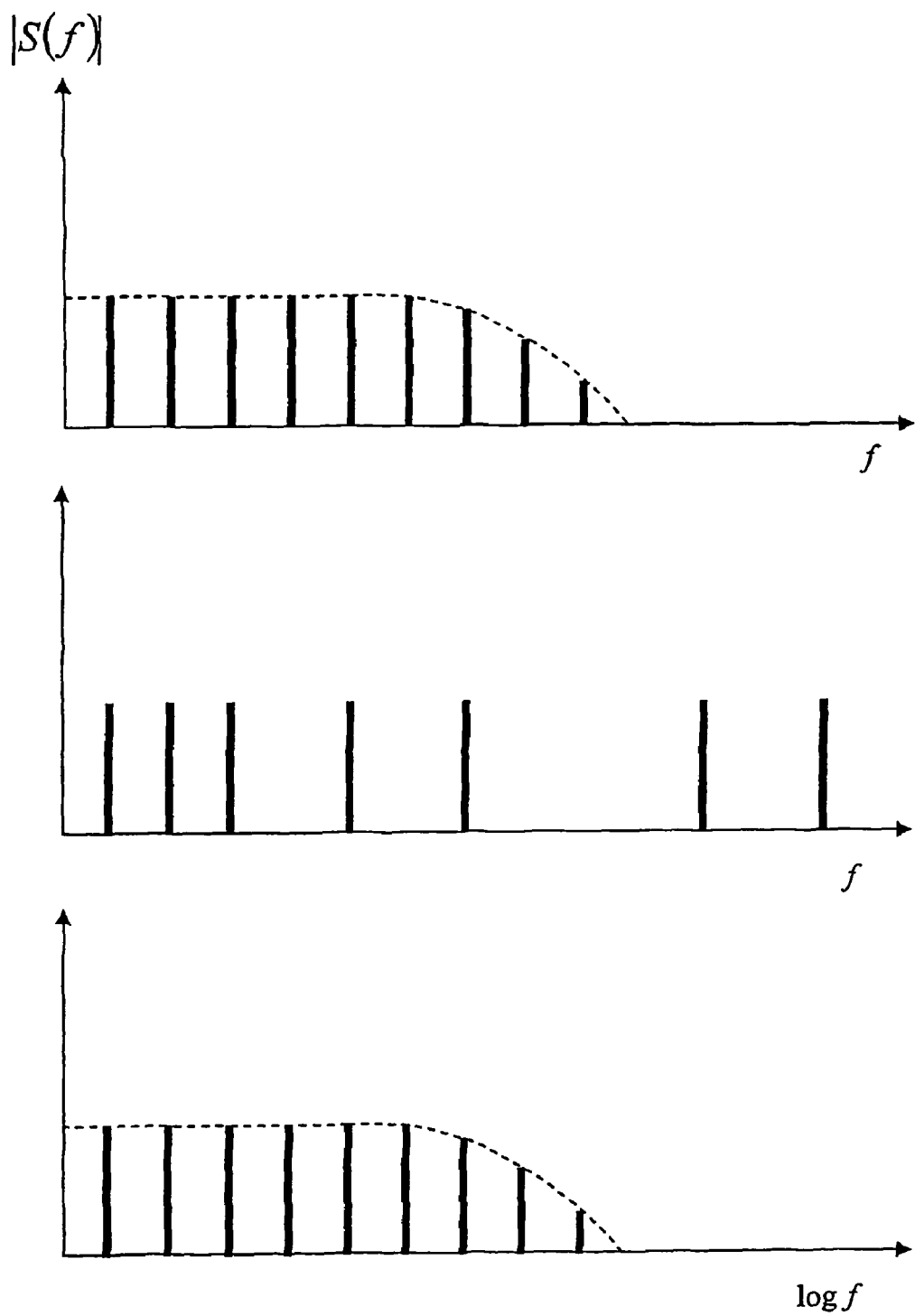
Figure 10:
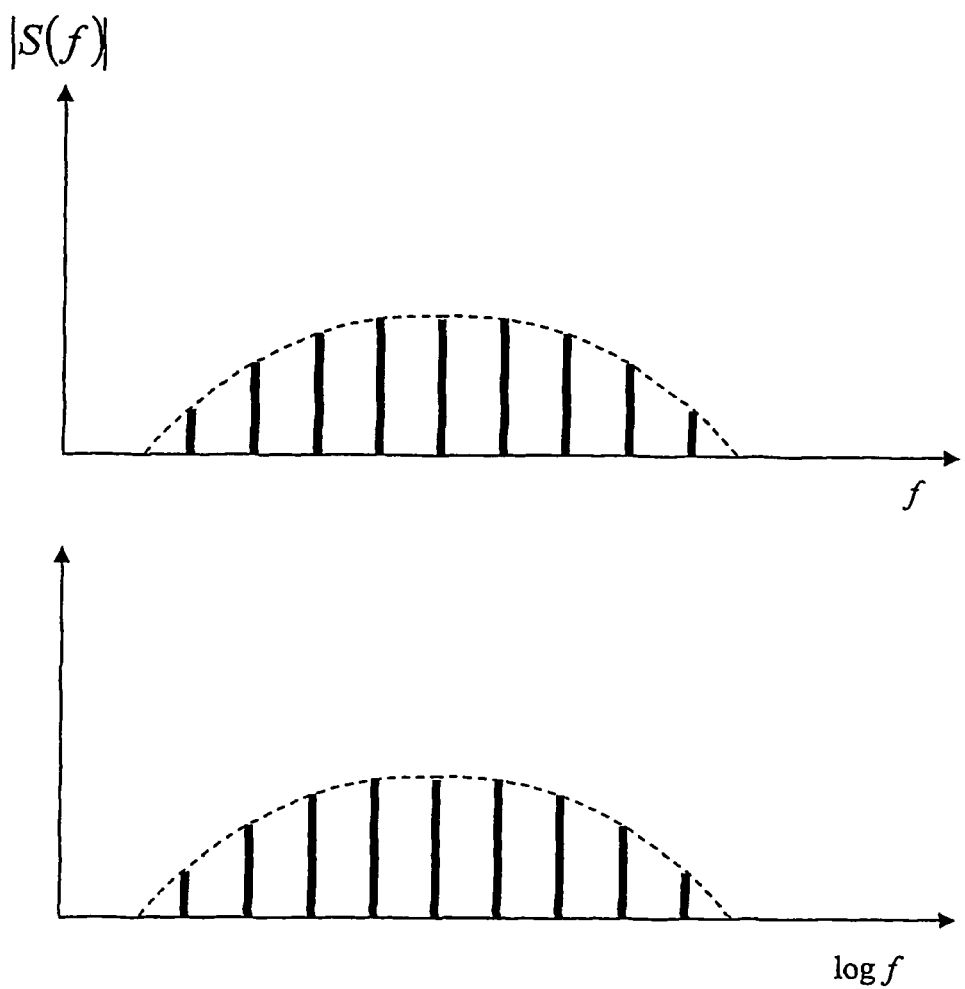
Figure 11:
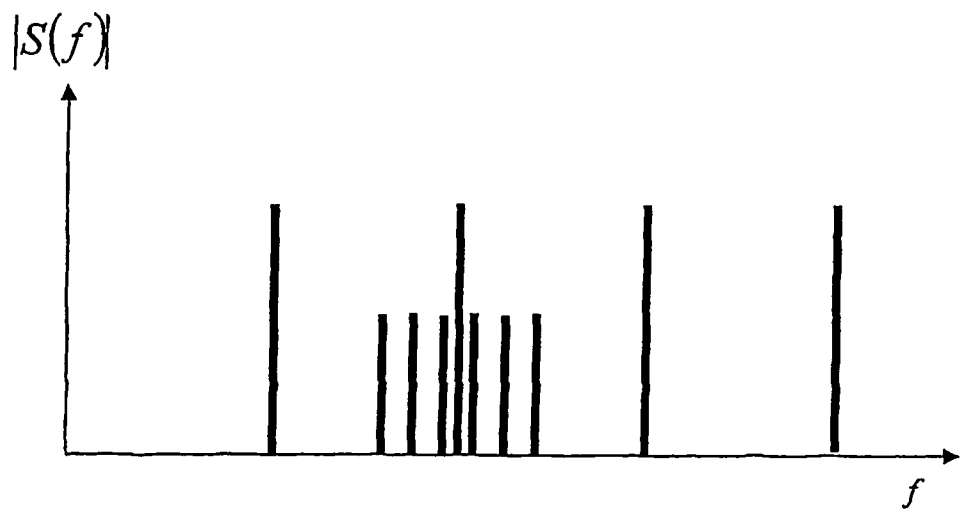
Figure 12:
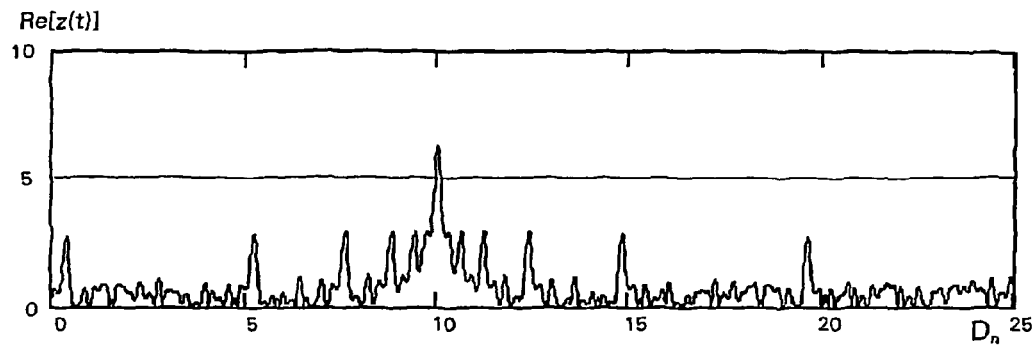
Figure 13:
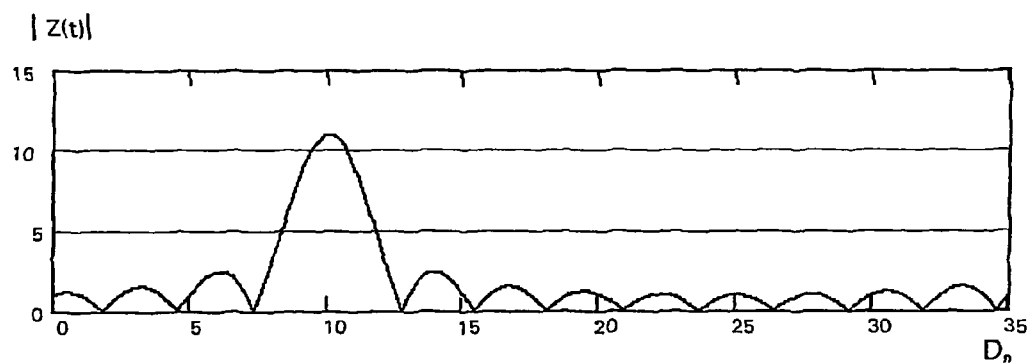
Figure 14:
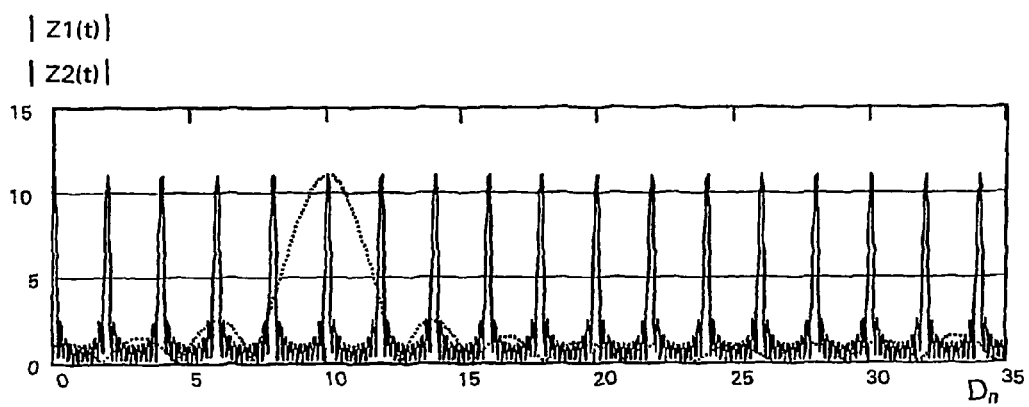
Figure 15:
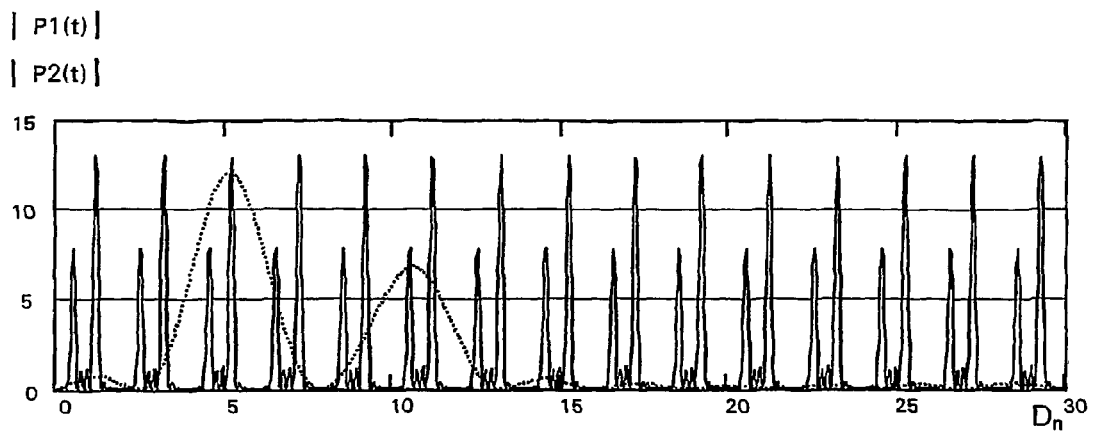
Figure 16:
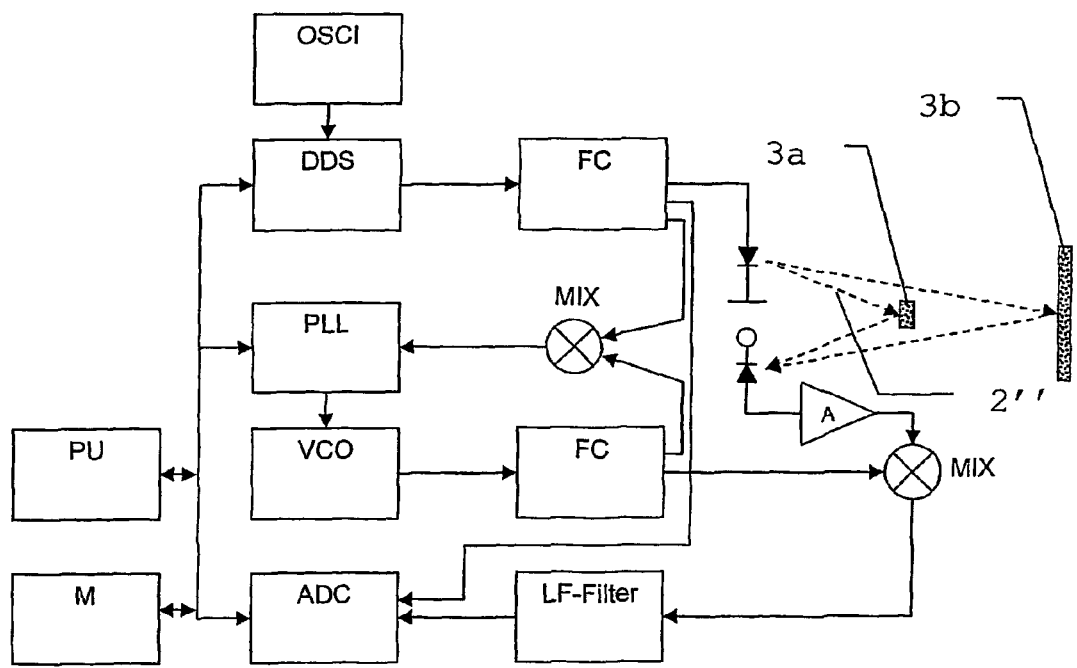
Figure 17:
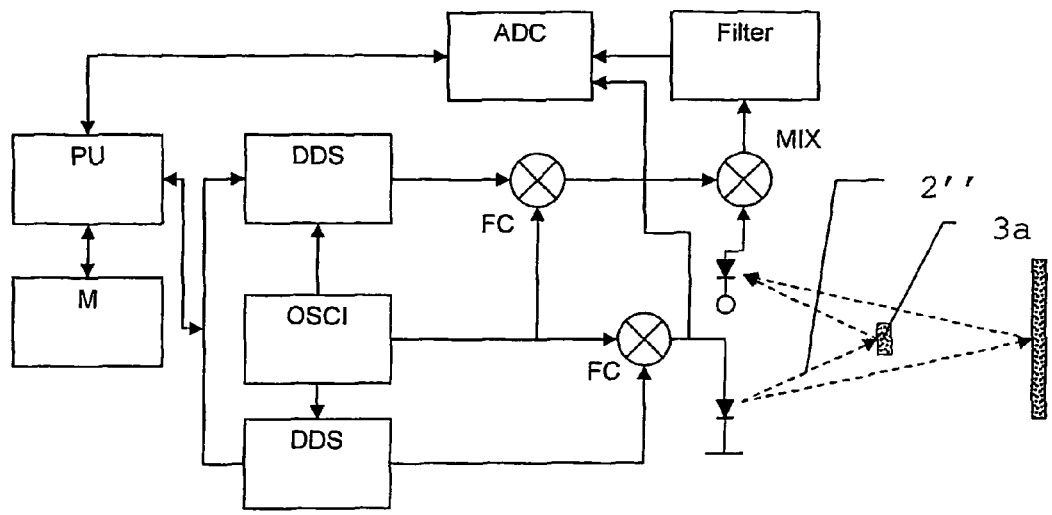
Figure 18:
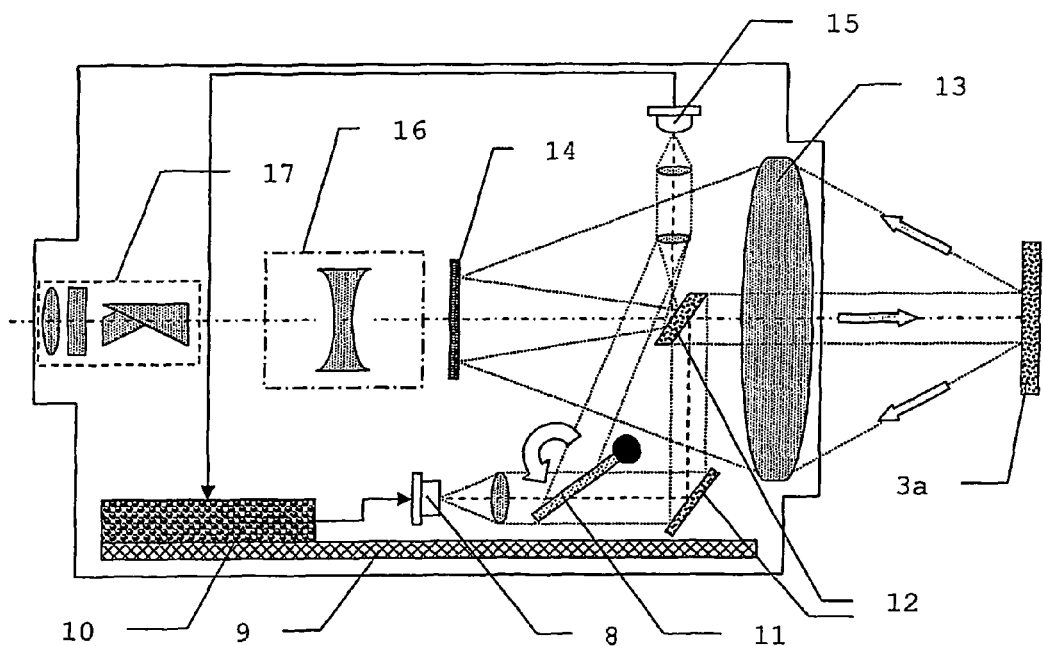
Figure 19:
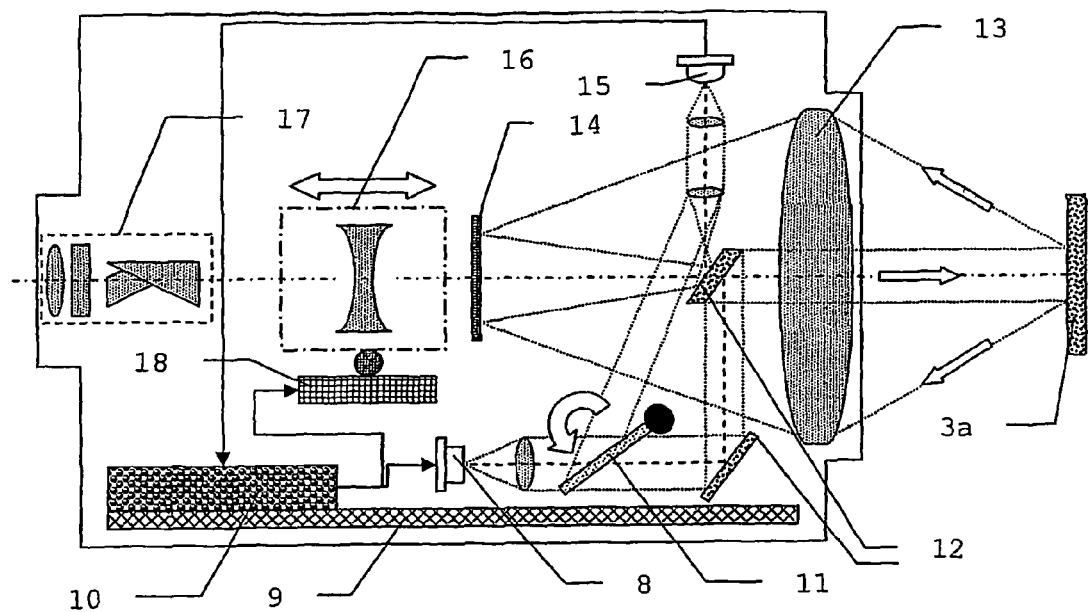
Figure 20:
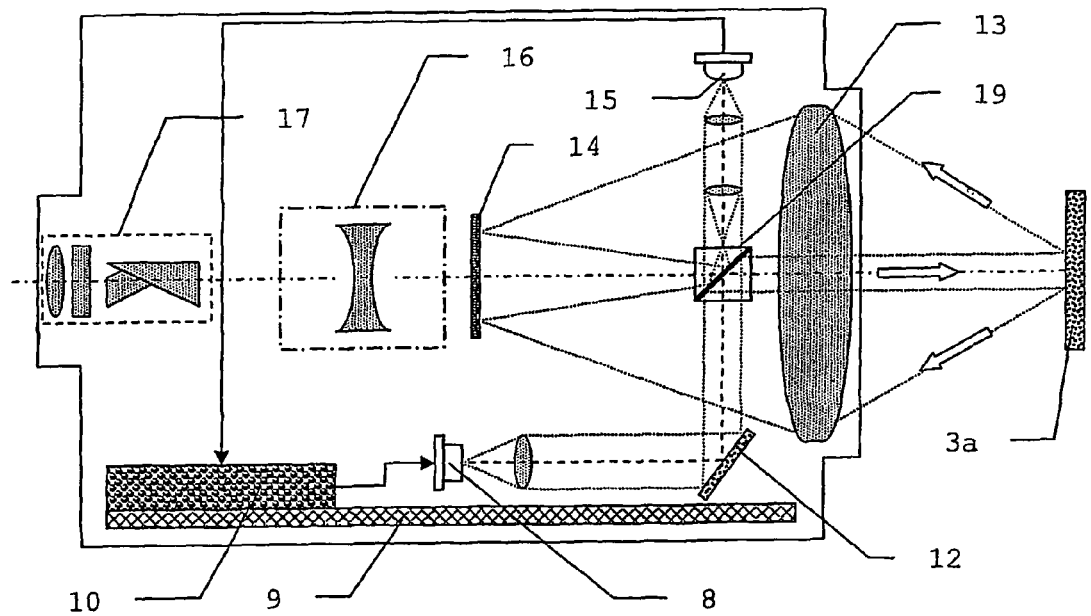
Figure 21:
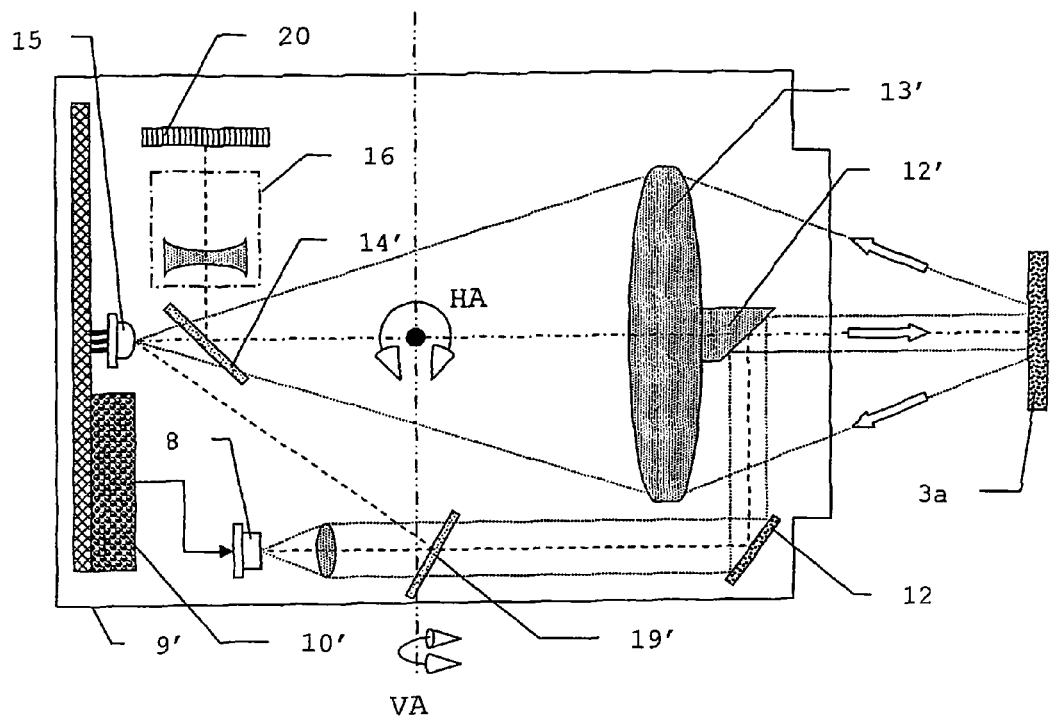
Figure 22:
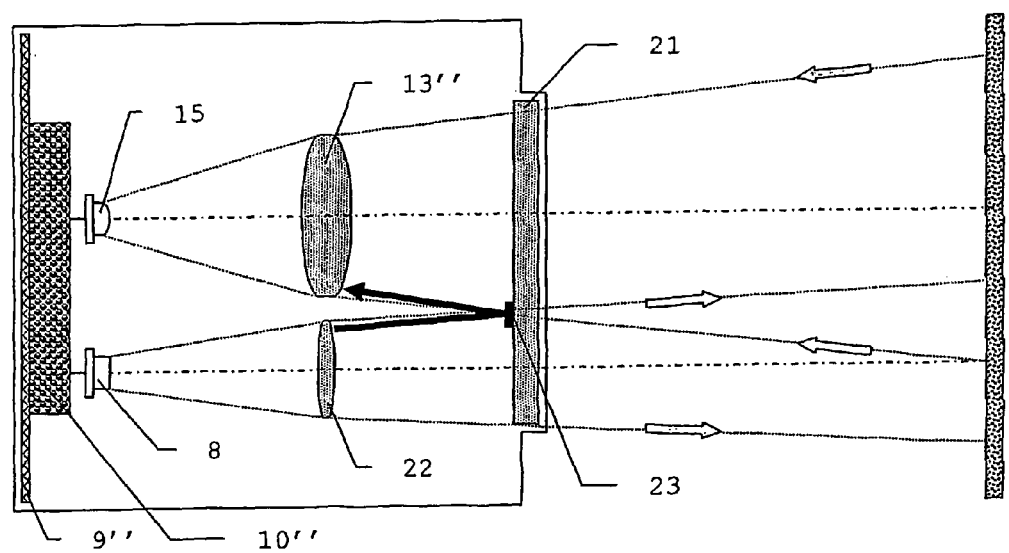

FIG. 5a-b show a diagram illustrating the principle of an example of the system analysis measuring method according to the invention;

FIG. 6a-b show exemplary input and output quantities for a system model of the method according to the invention;

FIG. 7 shows a system model for the method according to the invention with a combination of various part-systems;

FIG. 8 shows examples of suitable transmitted signals for the system analysis;

FIG. 9 shows examples of suitable spectral distributions of the total quantity of all transmitted signals;

FIG. 10 shows bandpass-limited discrete frequencies as further examples of spectral distributions of the total quantity of all transmitted signals;

FIG. 11 shows two sets of discrete frequencies having in each case different equidistant positioning as a further example of the spectral distribution of the total quantity of all transmitted signals;

FIG. 12 shows an exemplary time signal as a real part of the IFT of a spectrally logarithmically equidistant system analysis;

FIG. 13 shows an exemplary time signal as a magnitude of the IFT (envelope) of a spectrally equidistant system analysis;

FIG. 14 shows two exemplary time signals as a magnitude of the IFT of two spectrally equidistant frequency sets;

FIG. 15 shows exemplary power signals as an IFT of two spectrally equidistant frequency sets with two differently reflecting target objects;

FIG. 16 shows a block diagram for a device according to the invention, comprising a heterodyne mixer;

FIG. 17 shows a block diagram for a device according to the invention, comprising a heterodyne mixer and increased flexibility in the choice of frequency;

FIG. 18 shows the schematic diagram of a theodolite telescope with a device according to the invention as an example of a geodetic measuring instrument according to the invention;

FIG. 19 shows the schematic diagram of a theodolite telescope with a device according to the invention and the additional use for controlling an autofocus;

FIG. 20 shows the schematic diagram of a theodolite telescope with a device according to the invention and internal light path free of switching for simultaneous calibration;

FIG. 21 shows the schematic diagram of a scanner according to the invention with a device according to the invention; and FIG. 22 shows the schematic diagram of a biaxial telemeter with a device according to the invention and internal light path free of switching for simultaneous calibration.

Figure 1A:
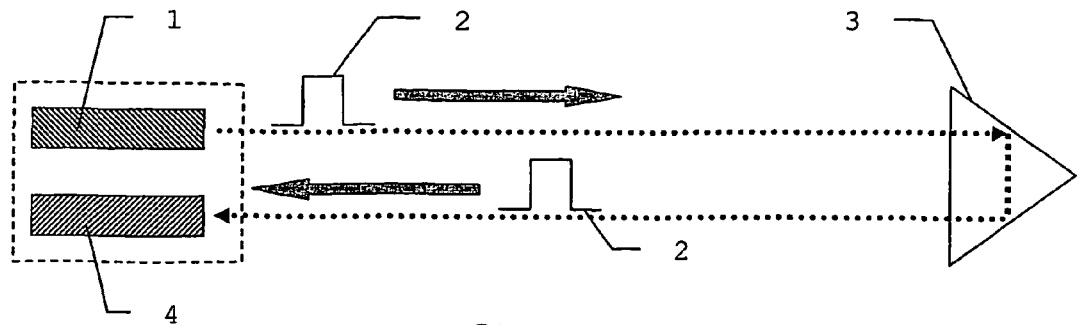
Figure 1B:
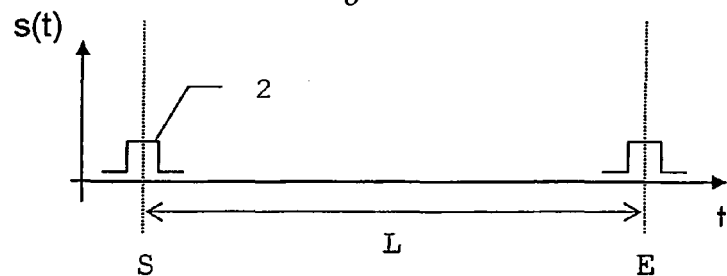

FIG. 1a-b show a diagram illustrating the principle of a pulse measuring method according to the prior art.

In FIG. 1a, a transmitter 1 emits a light pulse 2 which is detected again after reflection by the target, e.g. a retroreflector 3, by the receiver 4. In general, transmitter 1 and receiver 4 are arranged in one unit.

The distance is determined from the transit time L as the time difference between the start time S of the emission of a light pulse 2 and the time E of reception. The determination of the time of reception is effected by the evaluation of a feature of the signal pulse s(t), for example by the exceeding of a signal threshold or by determination of the center of gravity of the integrated pulse curve.

Figure 2A:
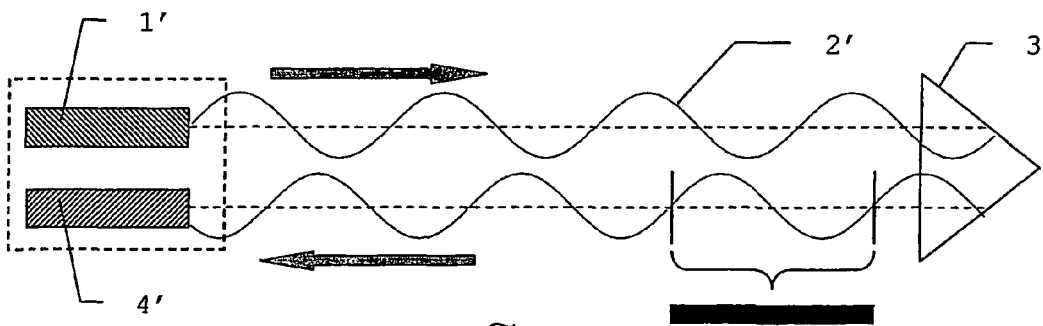
Figure 2B:
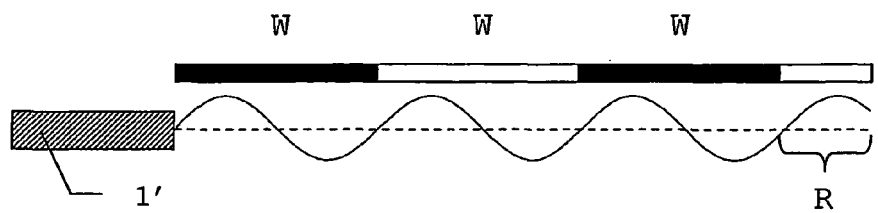

FIG. 2a-b show a diagram illustrating the principle of a phase measuring method according to the prior art, in which the distance between a unit and a target is determined.

In FIG. 2a, a transmitter 1' emits the modulated light signal as light wave 2 to a target which in turn may consist of a retroreflector 3, and said light signal is reflected back from there to the receiver 4'. In contrast to the transit time method, no time difference between emission and reception is registered in this case. The shift of the phase of the incoming and outgoing signal is recorded. This shift is dependent on the distance between unit and target, since this distance corresponds to a multiple of the wavelength W of the emitted light wave 2' and a residual R. This residual is the nonintegral component remaining on division of the distance by the wavelength W, as shown in FIG. 2b. The measured phase shift is a measure of the residual R, so that, with a knowledge of this residual R and the number of wavelengths W, the distance between measuring unit and target can be derived. Since the number of wavelengths W is not directly determined as an integral component in this method, an additional resolution of this ambiguity must be carried out. This can be effected, for example, by the use of a plurality of modulation frequencies (typically 2 to 5), for which the absolute phase of the received signal is calculated sequentially relative to the transmitted signal. The distance to the one target object can then be derived from the plurality of these measurements.

Figure 3:
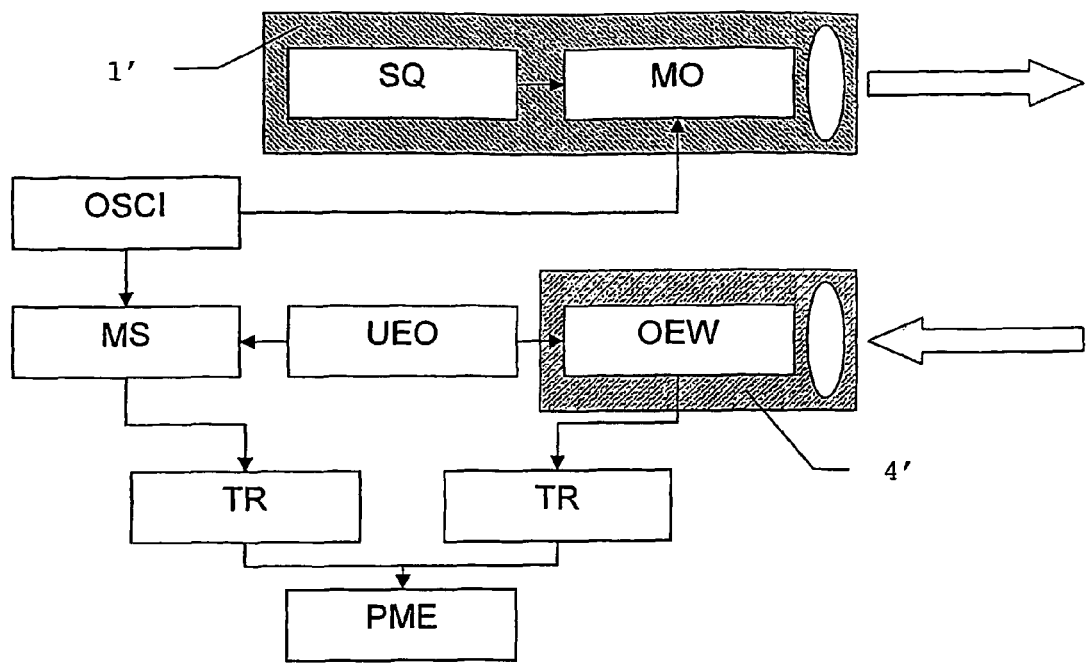
FIG. 3 shows a block diagram for a phase meter according to the prior art.

A realization suitable for a phase meter of the prior art is shown schematically in FIG. 3 by a block diagram. In the transmitter 1', a signal is modulated upon the light of a radiation source SQ by a modulator MO controlled by a high-frequency oscillator OSCI. After detection by the optical system of the receiver 4', the reflected light is converted in an opto-electronic converter OEW into a low-frequency signal. For this purpose, the signal of a superposition oscillator UEO is applied to the opto-electronic converter OEW. A mixing stage MS which produces a low-frequency resonance signal from the signal of the high-frequency oscillator is supplied by the same superposition oscillator UEO. The low-frequency signals are converted by a trigger TR into square pulses. In a subsequently arranged phase measuring unit PME, the mixed-in, low-frequency signals of the high frequency oscillator OSCI and of the received light are compared and the phase difference is determined. The phase difference is a measure of the distance.

Figure 4:
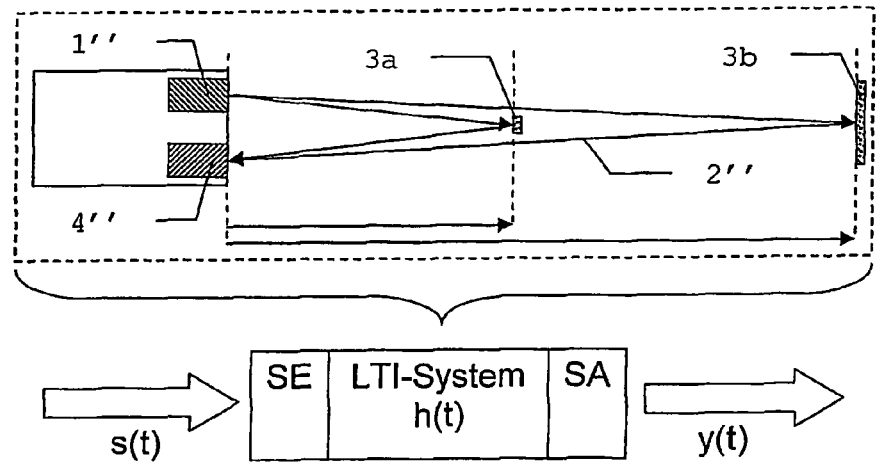
FIG. 4 shows a general diagram illustrating the principle of a system analysis measuring method according to the invention with a plurality of target objects.

FIG. 4 shows a diagram illustrating the general principle of the system analysis measuring method according to the invention with a plurality of target objects using a system model of the telemeter as a linear transmission system. A light signal 2" is emitted by a transmitter 1". This light signal 2' experiences a reflection by a plurality of targets, which are embodied here by way of example by a first target 3a and a second target 3b, and is detected by the receiver 4". The total system comprising transmitter 1", targets 3a, 3b and the receiver 4" is considered approximately as a time-invariant system (LTI system). However, this does not mean that the target objects are not permitted to move, but the movements must remain appropriately small within the measuring time for the system analysis. In order to derive distance data, a signal s(t) is applied to a system input SE and the signal amplitude y(t) of the system response describing the system recorded at a system output SA. Here, the system input and output are the interfaces of the LTI system to the outside world.

FIG. 5a is a diagram illustrating the principle of an embodiment of the system analysis measuring method according to the invention in the time range. The LTI system is excited repeatedly by a pulse-like, periodic signal which consists in each case of a plurality of discrete frequencies. For each excitation pulse sequence s(t), the signal amplitude or signal shape y(t) of the system response 5 registered by the receiver is recorded. With a change of pulse repetition frequency from $f_j$ to $f_k$, a relative time shift of the signal response by $\Delta t_{jk}$ results. These shift times $\Delta t_{jk}$ provide information about the number of pulses which are simultaneously in transit over the transmission distance and thus provide a rough estimate of the distances sought. A precise estimation of the distances is finally obtained by the determination of the transit time differences between the instantaneously emitted received signal pulses. For this purpose, it is possible to construct a time signal z(t) 6 which is formed from all time-shifted signal responses $h_k-(t-\Delta t_{jk})$. From z(t), the transit times $t_n$ are then determined by stochastic averaging.

FIG. 5b shows a diagram illustrating the principle of a further embodiment of the system analysis measuring method according to the invention. The LTI system is excited repeatedly by a signal which in each case consists of a plurality of discrete frequencies. For each excitation, the signal amplitude or signal shape y(t) of the system response 5' registered by the receiver is recorded and is subjected to a discrete Fourier transformation (DFT). The complex transmission function at the respective excited frequencies $f_j$ of the transmitted signal is derived from the DFT. In each case amplitude $S_j$ and phase shift $\phi_j$ can be calculated for the various frequencies of the spectrum from real and imaginary part. Once again, a reconstructed time signal z(t) 6' is derived from the aggregate of the spectra of all system responses of the various excitations by an inverse discrete Fourier transformation (DFT). The time signal z(t) 6' is equivalent to a distance signal z(D) in which the time parameter t is multiplied by half the velocity of light c. In this example, transit times $t_1$ and $t_2$, which permit identification of two targets and the determination of their distance can be determined from the curve of this reconstructed time signal 6'.

FIG. 6a-b show exemplary input and output parameters for a system model of the method according to the invention. FIG. 6a shows a triangular pulse which is applied at the system input with a periodic repetition in the MHz range for exciting the LTI system, the maximum of the signal amplitude z(t) corresponding to the time t=0. FIG. 6b schematically shows the system response y(t) picked up by the receiver and provided at the system output. In the two-target case assumed here, this response consists of two triangular curves of the received signal amplitude y(t), whose vertices are received at the time $t_1$ and $t_2$.

FIG. 7 shows a system model of the method according to the invention as a combination of d part-systems to give a LTI system 7, each of the d part-systems representing a target object. For linear systems, the superposition principle and the amplification principle and the principle of exchangeability of a system with the transit time or dead time $t_n$ applies. A system can therefore be exchanged with a dead time in the sequence without the output changing, so that the part-systems of the LTI system 7 can therefore also be drawn in another sequence and another organization. The signal y(t) present at the system output SA is therefore a linear and exchangeable superposition of the system responses $y_1(t-t_1)$ to $y_d(t-t_d)$ of all d part-systems on the respective excitation $s_1(t)$ to $s_d(t)$ resulting from application of a signal s(t) at the system input SE. The system model in FIG. 7 corresponds to equation 2.

FIG. 8 shows suitable transmitted signals for the system analysis, which can be formed, for example, as a sinusoidal oscillation (top) and as a sequence of needle or Dirac pulses (middle) or as square pulses (bottom).

FIG. 9 shows examples of suitable spectral distributions of the total quantity of all transmitted signals. The suitable spectral distribution of the total quantity of all transmitted signals (sum of all excitation signal spectra) is relevant for a system analysis. With a (single periodic) transmitted signal, as a rule a plurality of frequencies are generated (Fourier series). According to the invention, all simultaneously emitted frequencies are measured, recorded and evaluated.

For a complete system analysis, often a plurality of transmitted signals of different period lengths are emitted in sequence, the assignment as a sum of all frequencies in the spectral range being important. This assignment of the spectra, consisting of all transmitted/received frequencies, may be different. The frequencies can, for example, have equidistant or logarithmically equidistant positions. Further possibilities consist in a frequency interval which is chosen according to primary numbers or according to Fibonacci numbers. In FIG. 9, the uppermost frequency distribution corresponds to an equidistant positioning, the choice of frequency intervals which is shown in the middle is made on the basis of the scheme of primary numbers, whereas the lowermost distribution has a logarithmically equidistant positioning. In the upper and lower distribution, the quantity of all measured signals is shown explicitly spectrally limited on the receiver side (low-pass), so that the model assumption and the scanning theorem are fulfilled.

FIG. 10 shows band-limited discrete frequencies as further examples of spectral distributions of the total quantity of all transmitted signals. Here, there is a spectral distribution of all excitation signals with equidistant (top) or logarithmic equidistant (bottom) positioning.

FIG. 11 shows a further example of a suitable spectral distribution of the total quantity of all transmitted signals in the form of two sets of discrete frequencies having in each case different, equidistant positioning. The intervals of the two sets are preferably different.

FIG. 12 shows, by way of example, a reconstructed time signal or distance signal as an IFT of a spectrally logarithmically equidistant system analysis. The time signal z(t) is calculated as a cost function from a system analysis with logarithmically equidistant excitation frequencies. An optimum estimate of the transit time(s) is obtained by data evaluation in which the data of all partial measurements performed parallel and serially are included. For the 1-target case, an optimum estimator in the context of the maximum likelihood method is the calculation of a time signal by means of IFT from the transmission function H(f). The sought transit time $t_n$ or target distance $D_n$ corresponds to the highest signal peak. The time signal shown is the IFT of the transmission function $H(f_k)$ at the frequency points $f_k$.

FIG. 13 shows, by way of example, the envelope of a time signal as the IFT of a spectrally equidistant system analysis. The target distance $D_n$ is determined via a reconstructed time signal $|z(t)|$, which is calculated as a cost function from a system analysis with equidistant excitation frequencies. The time signal is generated by the IFT of the complex transmission function $H(f_k)$ with the measured frequency points $f_k$. The sought transit time once again corresponds to the highest signal peak. Time and distance are equivalent to one another because $$D = \frac{c}{2 \cdot t}.$$

FIG. 14 shows two exemplary time signals as an IFT of two spectrally equidistant frequency sets. The distance $D_n$ is derived by calculating a time signal z(t) as a cost function from a system analysis with two sets of excitation frequencies which have different equidistant intervals. The first time signal $z1(t)$ (dotted line) is determined by the IFT of the complex transmission function which is generated from the measured data of the first frequency set. The second time signal $z2(t)$ (solid line) is generated by the IFT of the complex transmission function, determined at the frequencies of the second set. A rough estimate of the transit times sought corresponds to the highest signal peaks from the first time signal. A precise estimate of the transit times sought corresponds to the highest signal peaks from the second time signal, in which the maxima coincide with the first time signal.

FIG. 15 shows, by way of example, power signals as an IFT of two spectrally equidistant frequency sets with two differently reflecting target objects. A cost function |P(t)| preferred for the multitarget case is shown. The cost function corresponds to the envelope of the time-related power signal P(t) of z(t), a situation of two target objects being measured. The first power signal $P1(t)$ (dotted line) is generated by the IFT of the complex transmission function which follows from the measured data of a first frequency set. The second power signal $P2(t)$ (solid line) is generated by the IFT of the complex transmission function, determined at the frequencies of a second set. A rough estimate of the transit times sought corresponds to the highest signal peak from the first power signal |P(t)|. A precise estimate of the transit times sought corresponds to the highest signal peak from the second power signal $|P2(t)|$, in which the maxima coincide with the first power signal.

An embodiment of a simple opto-electronic system analyzer comprising a heterodyne mixer as a device according to the invention is illustrated in FIG. 16 in the form of a block diagram. A frequency synthesizer according to DDS (direct digital synthesizer) technology is used. With such a module, it is possible to program all arbitrary harmonic frequencies and also arbitrary signals shapes. The frequency at the synthesizer can be switched within microseconds via a microprocessor. It is thus possible in a short time to scan through all the frequencies necessary for the system analysis and to measure real and imaginary part of the transmission function. The phase locked loop PLL serves, together with a voltage-controlled oscillator VCO, for generating a phase-stable mixer frequency for the heterodyne receiver. In the case of direct scanning of the system response or in the case of homodyne signal reception, the PLL may be omitted. The synthesized signals are converted by a frequency converter FC into very high frequencies. After an amplification circuit A, the received signal is converted by means of a product mixer MIX into a low-frequency time signal, then fed to a low-frequency filter LF and digitized in an analog/digital converter ADC. The signal data are collected by a processor unit PU and optionally stored in a memory M. A frequency-stable master oscillator OSCI serves as a time standard.

FIG. 17 shows a block diagram for a further embodiment of a device according to the invention comprising a heterodyne mixer and having increased flexibility in the choice of frequency. The generation of the excitation frequencies for the system analysis is effected by a first DDS synthesizer connected to a frequency converter for generating very high frequencies. Since the arrangement contains no phase locked loop PLL, there are various advantages, for example rapid frequency changeover in the μsec range is possible, or the frequency range of the DDS can be completely exhausted since the narrow lock range of the PLL is absent. A second DDS synthesizer which can be changed over just as rapidly generates the mixer signals for the heterodyne reception. The frequency converters FC transform the excitation and mixer signals into the desired frequency band. A frequency-stable master oscillator OSCI serves as a time standard. Further modules are a heterodyne mixer MIX, an analog/digital converter ADC for signal scanning, a memory M for data storage and a processor unit PU as a control and evaluation unit.

FIG. 18 schematically shows the telescope of a theodolite as an example of a geodetic measuring instrument according to the invention, comprising the device according to the invention. Light from a radiation source 8, which is arranged together with evaluation electronics 10 on a common support element 9, is emitted via switchable deflecting element 11, reflecting deflection means 12 and a lens 13 onto a first target 3a. This first target 3a is formed so as to be representative of the totality of the possible targets and is not limited to the one-target case. After reflection by the first target 3a, the light is collected by the lens 13 and fed for signal processing via a dichroic mirror element 14 and a reflecting deflection means 12 to the receiver 15. The signal of the receiver 15 is processed by the evaluation electronics 10, and the distance data are stored. By means of the switchable deflecting element 11 a part of the light emitted by the radiation source 8 is fed directly to the receiver 15 so as to realize an internal reference system which is also suitable for system calibration. The lens 13 is used as a transmitting and receiving lens, but transmitter and receiver may also be arranged biaxially with two separate lenses.

In addition to the means for signal processing, the theodolite telescope also has a visual optical system which makes the light back-reflected from the first target 3a usable for the human observer. A focusing member 16 and an eyepiece member 17, which in turn may have different components, such as, for example, an inverting prism, are used for this purpose.

FIG. 19 shows the schematic diagram of a theodolite telescope comprising a device according to the invention and the additional use for controlling an autofocus. With the design similar in principle to FIG. 18, this embodiment has an adjusting element 18 which is controlled by the evaluation electronics 10 and serves for automatic adjustment of the focusing member 16.

A further embodiment of a theodolite telescope comprises a device according to the invention and an alternative realization of the beam path is shown schematically in FIG. 20. Light is emitted by a radiation source 8 which once again is arranged together with evaluation electronics 10 on a common support element 9, onto a reflecting deflection means 12. This reflecting deflection means 12 deflects parts of the light via a beam splitter 19 both directly onto the receiver 15 and onto the lens 13 and hence the at least one target 3a. After reflection, the light is once again collected by the lens 13 and fed for signal processing via a dichroic mirror element 14 and the beam splitter 19 to the receiver 15. The signal of the receiver 15 is processed by the evaluation electronics 10, and the distance data are derived. The internal reference distance is defined by the beam splitter 19. The system calibration is effected in this case simultaneously with the distance measurement to the external target object.

FIG. 21 shows, by way of example, a schematic diagram of a scanner according to the invention with a device according to the invention. For recording three-dimensional images, light from radiation source 8, which is arranged together with evaluation electronics 10' in the housing with a common support element 9', is sent via a beam-splitting deflecting element 19', a reflecting deflection means 12 and a deflecting element 12', which is coordinated with the lens 13', to scenery which is to be recorded and whose different surface structures in this diagram are represented by a first target 3a.

After reflection, the light is collected by the lens 13' and fed via a dichroic mirror element 14' to the receiver 15. In particular, the measuring environment but also a part of the transmitted signal is fed via the mirror element 14' to an image sensor 20. The signal of the receiver 15 is processed by the evaluation electronics 10', and the distance data are derived. Arranged between dichroic mirror element 14' and the image sensor is a focusing member 16, which can also be provided with an adjusting element in a manner analogous to FIG. 19 and can be automatically adjusted. The measuring environment detected by the image sensor is thus sharply focused.

By means of the beam-splitting deflecting element 19', a part of the light emitted by the radiation source 8 is fed directly to the receiver 15 so as to realize an internal reference distance which is suitable for system calibration in this embodiment too.

The control and orientation of the scanning light beam can be effected in a manner known per se both by pivoting of the entire unit and by changing the emission direction. In this example, the movement of the entire unit is shown explicitly without thereby excluding other realization forms, for example having internal adjusting elements or beam-modifying optical components. In this example, the entire unit is mounted pivotably about a horizontal axis HA and a vertical axis VA so that scannability of the entire measurement region is realized by the coordination of horizontal and vertical pivot movement.

FIG. 22 shows a schematic diagram of a biaxial telemeter comprising device according to the invention and internal light path free of switching for simultaneous calibration. Light from a radiation source 8, which is arranged together with evaluation electronics 10" on a common support element 9", is emitted as a transmitted beam and emitted via a transmitting optical system 22 through an exit window 21 onto a target 3a. After reflection, the light is collected by a receiving optical system 13" and fed for signal processing to the receiver 15. The signal of the receiver 15 is processed by the evaluation electronics 10", and the distance data are derived. A part of the transmitter beam is reflected by the exit window 21 and strikes the biaxially arranged receiver 15. The location and intensity of the reflection can be dimensioned by suitable surface treatment, for example by a coating or the application of a reflecting component 23, on the exit window 21.

The invention claimed is:

1. A method for deriving geodetic distance data, comprising:
    a signal generator for generating at least two discrete high modulation frequencies in
    the MHz to GHz range;
    a system including:
        a system input;
        an optical radiation source;
        at least one target object; and
        a receiver having a system output; and
    evaluation electronics,
    the method comprising the steps of:
        excitation of the system with the at least two discrete modulation frequencies by application of at least one excitation signal to the system input;
        recording of at least one signal shape of a system response as a change in signal amplitude with respect to time by an ADC at the system output in response to the excitation;
        derivation of at least one distance datum from a signal shape of the at least one system response by the evaluation electronics;
    the distance data being derived with a measuring accuracy in a millimeter range from:
        at least a part of the signal shape of the at least one system response, or
        a time structure of the signal shape of the at least one system response, the distance data being derived according to a model of the system
    wherein a system identification is performed with a parameter of the model of the system as the transit time to the target objects at which the measuring beam is directed, the determination of the distance is including the measured signal shape in the time domain or frequency domain.

2. The method as claimed in claim 1, wherein the distance data are derived from:
    at least a part of the signal shape of the at least one signal response; and
    the time structure of the signal shape of the at least one signal response during derivation of the at least one distance datum.

3. The method as claimed in claim 1, wherein, during excitation of the system, the at least one excitation signal is chosen so that the excitation signal has for each of the at least two modulation frequencies either exactly one spectral line or a family of spectral lines in the frequency domain.

4. The method as claimed in claim 3, wherein, during excitation of the system, the at least one excitation signal is chosen so that the excitation signal has a fundamental harmonic and a plurality of higher harmonic spectral lines in the frequency domain.

5. The method as claimed in claim 1, wherein the steps of excitation of the system, recording of at least one system response, and derivation of at least one distance datum are repeated at least once wholly or partly, the modulation frequency being varied out of the at least two discrete high modulation frequencies with each repetition during excitation of the system.

6. The method as claimed in claim 1, wherein, during excitation of the system, the modulation frequencies are generated so that they are higher than 10 MHz.

7. The method as claimed in claim 1, wherein, during excitation of the system, the at least one excitation signal is generated so that it has a periodicity with respect to time.

8. The method as claimed in claim 7, wherein, during excitation of the system, the at least one excitation signal is generated so that it has one of the following pulse shapes:
square, triangular, Dirac pulse, and/or pulse family.

9. The method as claimed in claim 7, wherein the excitation of the system is effected with at least two excitation signals which have different repetition frequencies.

10. The method as claimed in claim 1, wherein, during excitation of the system, the modulation frequencies are chosen according to one of the following schemes:
equidistant frequency interval,
logarithmically equidistant frequency interval,
frequency interval corresponding to a partial sequence (primary numbers),
frequency interval corresponding to a partial sequence of Fibonacci numbers, and/or
at least two frequency groups,
wherein the modulation frequency within each group has equidistant frequency intervals.

11. The method as claimed in claim 1, wherein, during recording of the at least one system response, the frequency spectrum coordinated with a system response is band-limited.

12. The method as claimed in claim 1, wherein, during excitation of the system and recording of the at least one system response for each excitation signal applied to the system input, scanning of the associated system response is carried out.

13. The method as claimed in claim 1, wherein, during derivation of at least one distance datum, the distance datum is derived directly in the time domain by evaluating the signal shapes and the time shifts of at least two system responses.

14. The method as claimed in claim 13, wherein, during derivation of at least one distance datum, a system calibration is carried out.

15. The method as claimed in claim 14, wherein the system calibration is carried out via a system-internal optical reference distance.

16. The method as claimed in claim 13, wherein the at least one distance datum is derived by means of a nonlinear balancing calculation.

17. The method as claimed in claim 1, wherein, during derivation of at least one distance datum, the distance datum is derived in the frequency domain.

18. The method as claimed in claim 17, wherein the at least one distance datum is derived by means of parameter optimization of a cost function.

19. The method as claimed in claim 18, wherein the data from an aggregate of at least two system responses are taken into account and evaluated in the cost function.

20. The method as claimed in claim 18, wherein the data of an individual system response in each case are taken into account and evaluated in the cost function.

21. The method as claimed in claim 17, wherein the distance datum is derived in the frequency domain according to a Laplace or Fourier transformation of the time signal of the at least one system response.

22. The method as claimed in claim 17, wherein the distance datum is derived in the frequency domain with stochastic weighting determined by at least one noise measurement on the at least one system response.

23. The method as claimed in claim 1, wherein, during derivation of at least one distance datum, the distance datum is derived by an inverse transformation after a transformation in the at least one system response in the frequency domain and a subsequent construction of a time signal in the time domain.

24. The method as claimed in claim 23, wherein, in the frequency domain, at least two system responses are combined into an aggregate, from which the construction of the time signal in the time domain is effected.

25. The method as claimed in claim 23, wherein, in the frequency domain, a first family of equidistant, complex spectral lines are combined, from which the construction of a first time signal in the time domain is effected and additionally a second family of equidistant, complex spectral lines are combined, from which the construction of a second time signal in the time domain is effected.

26. A device for carrying out the method as claimed in claim 1, comprising:
a signal generator for generating modulation frequencies;
a system including:
a system input;
an optical radiationsource;
at least one target object; and
a receiver having a system output; and
evaluation electronics,
wherein the signal generator has at least one direct digital synthesizer or fractional-N synthesizer.

27. The device as claimed in claim 26, wherein a quartz-stable master oscillator is connected upstream of the digital signal generator.

28. The device as claimed in claim 26,
wherein an electronic
frequency converter for rapid switching and filtering of the modulation frequencies is coordinated with the digital signal generator.

29. The device as claimed in claim 28, wherein the electronic frequency converter is coordinated with the digital signal generator as ASIC with frequency divider, frequency multiplier and frequency changeover.

30. The device as claimed in claim 26, wherein a tracking synchronization with voltage-controlled oscillator for generating mixer frequencies for the heterodyne signal reception is coordinated with the digital signal generator.

31. The device as claimed in claim 26, wherein the signal generator is formed for generating modulation frequencies above 10 MHz.

32. The device as claimed in claim 26, further comprising:
an adjustable low-pass or bandpass filter in the receiving part of the
system output.

33. A geodetic measuring instrument being a theodolite, comprising a device as claimed in claim 26 for distance measurement to one object or a plurality of objects simultaneously.

34. The geodetic measuring instrument as claimed in claim 33, further comprising:
a reflecting component internally in the instrument, the reflecting component being a reflective coating on the inside of an exit window coordinated with the radiation source, for definition of an internal reference distance.

35. A scanner for the three-dimensional scanning of an image to be recorded, comprising a device as claimed in claim 26.

36. The use of a device as claimed in claim 26 for controlling an autofocus.

37. The use of a device as claimed in claim 26 as a telemeter having multitarget capabilities, an internal optical reference distance free of switching defining a first target object to be surveyed.

38. The use of a device as claimed in claim 26 as a telemeter with simultaneous multiple modulation for rapid 3-dimensional object surveying.

39. The method as claimed in claim 1, wherein the signal shape of the at least one system response includes a time element, a frequency element, a noise element, and an amplitude element of the at least one system response.

* * * * *